United States Patent
McMahon et al.

(10) Patent No.: US 9,797,370 B1
(45) Date of Patent: Oct. 24, 2017

(54) HIGH TORQUE WIND TURBINE BLADE, TURBINE, AND ASSOCIATED SYSTEMS AND METHODS

(71) Applicant: Primo Wind, Inc., San Diego, CA (US)

(72) Inventors: Edward McMahon, San Diego, CA (US); Lauren Hoffman, San Diego, CA (US)

(73) Assignee: Primo Wind, Inc., San Diego, CA (US)

( * ) Notice: Subject to any disclaimer, the term of this patent is extended or adjusted under 35 U.S.C. 154(b) by 0 days.

(21) Appl. No.: 15/462,686

(22) Filed: Mar. 17, 2017

(51) Int. Cl.
*F03D 1/06* (2006.01)
*F03D 9/25* (2016.01)

(52) U.S. Cl.
CPC ......... *F03D 1/0633* (2013.01); *F03D 1/0641* (2013.01); *F03D 1/0658* (2013.01); *F03D 9/25* (2016.05); *F05B 2240/221* (2013.01); *F05B 2240/60* (2013.01); *F05B 2250/712* (2013.01); *F05B 2280/4003* (2013.01)

(58) Field of Classification Search
CPC .... F03D 1/0633; F03D 1/0641; F03D 1/0658; F03D 1/0675; F03D 9/25; F03D 9/34; F03D 7/0296; F05B 2240/221; F05B 2240/60; F05B 2250/712; F05B 2280/4003
See application file for complete search history.

(56) References Cited

U.S. PATENT DOCUMENTS

| 1,076,251 | A | 10/1913 | Vaught |
| 5,876,181 | A | 3/1999 | Shin |
| 6,402,472 | B1 | 6/2002 | Hogue et al. |
| 6,910,867 | B2* | 6/2005 | Corten ................. F03D 1/0641 416/223 R |
| 7,040,859 | B2 | 5/2006 | Kane |

(Continued)

FOREIGN PATENT DOCUMENTS

EP     2141358 A1     1/2010

OTHER PUBLICATIONS

Extreme Wind Turbine Design, High Density Polyethylene HDPE Wind Turbine Generator Blades, Oct. 2016, www.manta.com, pp. 1-6 (IDS NPL Document No. 6).*

(Continued)

*Primary Examiner* — Craig Kim
*Assistant Examiner* — Brian P Wolcott
(74) *Attorney, Agent, or Firm* — Perkins Coie LLP

(57) ABSTRACT

A blade for a wind turbine can include an elongated and curved sheet having a curved root, a curved tip, a leading edge, and a trailing edge. The root and the tip can be rotated relative to each other such that the blade is twisted along its length. The root can include an edge having curved projections, the curved projections being distributed along a curvature of the root. A wind turbine can include a mounting element and a plurality of turbine blades. Each turbine blade can be attached to the mounting element closer to the trailing edge than to the leading edge such that an intersection of the leading edge and the root projects upstream from the wind turbine. A wind turbine generator assembly for converting wind into electrical energy can include a wind turbine and a generator. In addition, a support structure can support the wind turbine and generator.

20 Claims, 17 Drawing Sheets

(56) References Cited

U.S. PATENT DOCUMENTS

| | | | |
|---|---|---|---|
| 8,083,488 | B2 | 12/2011 | Fritz |
| 8,500,408 | B2 | 8/2013 | Baker et al. |
| 9,004,851 | B1 | 4/2015 | Garza |
| 9,188,102 | B2 | 11/2015 | Krishnamurthy et al. |
| 9,347,433 | B2* | 5/2016 | Schellstede ............. F03D 9/002 |
| 2007/0114798 | A1 | 5/2007 | Cairo |
| 2007/0258806 | A1 | 11/2007 | Hart |
| 2009/0074585 | A1 | 3/2009 | Koegler et al. |
| 2009/0257885 | A1 | 10/2009 | Godsk et al. |
| 2010/0196153 | A1 | 8/2010 | DeRuyter et al. |
| 2010/0270800 | A1 | 10/2010 | Krietzman et al. |
| 2010/0329879 | A1* | 12/2010 | Presz, Jr. ............. F03D 1/0633 416/228 |
| 2011/0027087 | A1 | 2/2011 | Rokeby-Thomas |
| 2016/0059938 | A1* | 3/2016 | Momayez ............... H02S 10/40 440/6 |
| 2016/0290314 | A1* | 10/2016 | Sorensen ............. F03D 1/0633 |

OTHER PUBLICATIONS

Extreme Wind Turbine Design, Directional Radial Wind Turbine Generator Rotor Blade Hubs, Oct. 2016, www.manta.com, pp. 1-6 (IDS NPL Document No. 8).*

Free Spirit Energy, Mounting Plate for Horizontal Mounting of Wind Turbines, Oct. 2015, https://web-beta.archive.org/web/20150519203959/http://freespiritenergy.com:80/mounting_plate.html.*

Wind Turbine Blade Aerodynamics, WE Handbook, Aerodynamics and Loads, pp. 1-10.

Virtually Indestructable Wind Turbine Generator Blade and Hub Assembly, Extreme Wind Turbine Blades, available at https://web.archive.org/web/20140814015810/http:/www.absblades.com/.

Virtually Indestructable HDPE Wind Turbine Generator Blades and 9X Steel Hub Assembly, Extreme Wind Turbine Blades, available at https://web.archive.org/web/20141219001533/http://www.absblades.com/.

Ichter, Brian et al., Amorphing downwind-aligned rotor concept based on a 13-MW wind turbine, Wind Energ., 2015.

Complete Custom Wind Energy Off Grid Systems Available with Sealed Bearing Pivot Mounts, previously available at http://www.manta.com/cp/mxfmt4w/4f59a93bdba1ff941b00000a/complete-custom-wind-energy-off-grid-systems-available-with-sealed-bearing-pivot-mounts.

High Density Polyethylene HDPE Wind Turbine Generator Blades, previously available at http://www.manta.com/cp/mxfmt4w/4f59a93bf97c83a41e0000001/high-density-polyethylene-hdpe-wind-turbine-generator-blades.

Extreme Wind™ Turbine Design, previously available at http://www.manta.com/c/mxfmt4w/extreme-wind-turbine-design.

Directional Radial Wind Turbine Generator Rotor Blade Hubs, previously available at o http://www.manta.com/cp/mxfmt4w/4f59a93b2305368e13000017/directional-radial-wind-turbine-generator-rotor-blade-hubs.

Wind Turbine Design, YouTube Channel, available at https://www.youtube.com/user/ABSBlades.

Extreme Wind™ Turbine Generator Blades, YouTube Channel, available at https://www.youtube.com/channel/UCliVdL2aMOxOfqnGG4AUprA.

Missouri Wind and Solar Vs Extreme Wind Turbines Blades, YouTube Video, available at https://www.youtube.com/watch?v=0ClxfJ2WlrE, published Mar. 26, 2016.

Un-Design Certification/Periodic Retest, Illing Part No. 4200N, Illing Company, Inc., dated Jan. 2, 2014.

New Report Shows Potential Growth of Distributed Wind Energy for On-Site Power, available at https://energy.gov/eere/articles/new-report-shows-potential-growth-distributed-wind-energy-site-power, published Nov. 21, 2016.

Fish, Frank E., Paul W. Weber, Mark M. Murray, and Laurens E. Howie. "The Tubercles on Humpback Whales' Flippers: Application of Bio-Inspired Technology." Integrative and Comparative Biology 51.1 (2011): 203-13.

Tubercle effect, Wikipedia, available at https://en.wikipedia.org/wiki/Tubercle_effect, last modified Mar. 4, 2017.

Mimicking whale tubercles in turbines, available at http://www.coastalwiki.org/wiki/Mimicking_whale_tubercles_in_turbines, last modified Nov. 7, 2013.

Marlex® HXB TR-512 Polyethylene, Marlex Polyethylene, available at http://www.cpchem.com/bl/polyethylene/en-us/tdslibrary/Marlex%20HXB%20TR-512%20Polyethylena.pdf.

Niovapol® HB-W555-A Resin, Nova Chemicals, available at http://www.novachem.com/Product%20Documents/NOVAPOLHB-W555-A_DS_EN.pdf.

Virtually Indestructable Wind Turbine Blade and Hub Assembly, ABS Wind Turbine Blade, True Wind Turbine Designs, ABS Blade, available at https://web.archive.org/web/20130415230949/http:/www.absblades.com/.

Un-Design Certification/Periodic Retest, File No. # 112-14, Mauser, dated Sep. 25, 2014, available at https://www.uline.com/pdf/ts-11861.pdf.

* cited by examiner

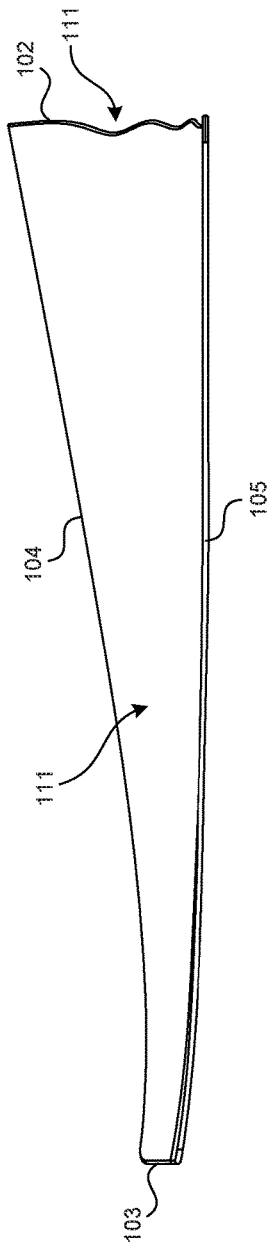
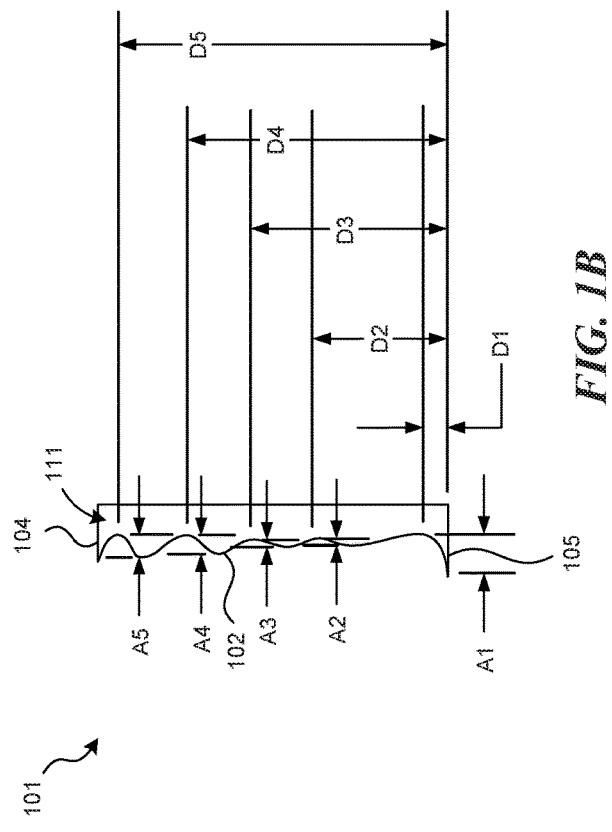

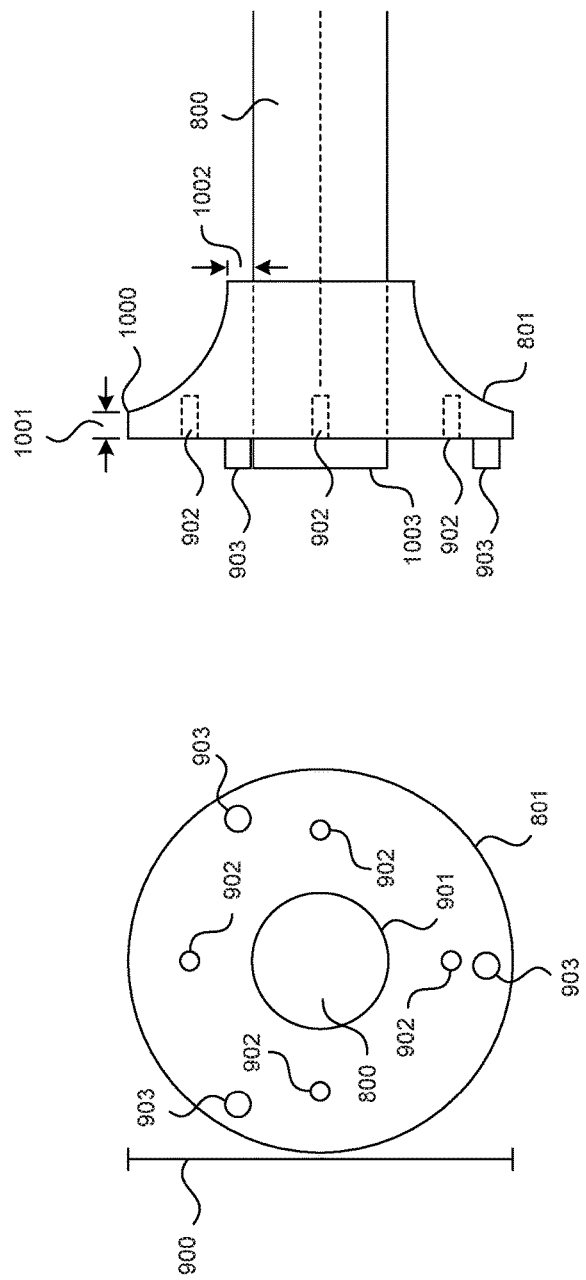
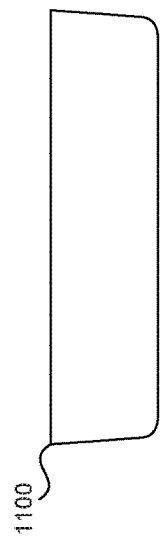
FIG. 9
FIG. 10
FIG. 8

HIGH TORQUE WIND TURBINE BLADE, TURBINE, AND ASSOCIATED SYSTEMS AND METHODS

TECHNICAL FIELD

The present technology is directed generally to a blade design for use in a wind turbine, wind turbines implementing the blade design (such as a plurality of the blades), and a wind turbine generator assembly implementing a wind turbine.

BACKGROUND

Current developments in wind turbine design often focus on large scale kilowatt and megawatt installations. In such cases, fewer, very-large blades have been found to be most efficient. For example, adding more than 3 blades to very large turbines has been reported to produce diminishing returns in energy production. Additionally, more blades on very large scale turbines results in a much noisier turbine due in part to the aerodynamic effects of air flowing over the blade surfaces. Moreover, large commercial turbine power generating systems need to be located in specific high-wind locations, such as the crests of hills in windy geographies.

Smaller scale applications, such as those related to domestic, marine, and remote field power generation, have different requirements. For example, domestic or mobile turbines, by their nature, may be placed in locations with inconsistent or low winds.

Current turbines of any size produce undesirable levels of noise, at least in part because of aerodynamic effects of current blade designs chopping the air (a constant whooshing sound). Accordingly, in some instances, users may lock such turbines and avoid their use when people are nearby, such as when a boat is occupied or when people nearby are sleeping. If a user chooses to lock a turbine at night to reduce noise, the undesirable noise has the ultimate effect of reducing the turbine's efficacy. Such undesirable noise levels may also contribute to the relatively higher popularity of solar energy for domestic, home-based, and/or off-grid power generation, despite the fact that solar power does not work at night, while wind power does. And current turbines are less portable than solar panels or batteries, so solar power and batteries are a predominant power source for remote uses by hikers or others in remote areas.

Accordingly, there is a need for quieter turbines, turbines that can generate power at low wind speeds, turbines with improved efficiency, and—for many applications—turbines and related assemblies for power generation that are light weight, resilient, and/or portable.

Such small-scale and/or local turbines can be referred to as distributed wind energy. Distributed wind energy is local wind energy production implemented near the site of energy use, as opposed to large-scale wind energy production like the wind farms operated by utility companies. Examples of distributed wind may include the above domestic, marine, and/or remote implementations. Distributed wind can be implemented to support off-grid sites or it can supplement on-grid sites.

The United States Department of Energy has recognized that distributed wind energy is not only feasible; it has the potential to become a major source of energy during the next several decades. But to become such a major source of energy, distributed wind devices need to be lower in cost, more efficient, and easier for consumers to implement.

Many shapes in nature have evolved over millions of years to provide efficient solutions to survival problems for natural organisms. Biomimicry in some manmade devices has taken advantage of concepts learned from analysis of natural biological solutions. One important mechanism is the fin of a humpback whale, which has structures called tubercles that scientists have credited with improved maneuverability and efficiency for the whale due to improved fluid dynamics.

SUMMARY

The following summary is provided for the convenience of the reader and identifies several representative embodiments of the disclosed technology. Such representative embodiments are examples only and do not constitute the full scope of the invention.

Representative embodiments of the present technology include a wind turbine generator assembly for converting wind into electrical energy. The assembly can include a wind turbine and a generator configured to receive rotational force from the wind turbine and convert the rotational force to electrical energy. The wind turbine can include a mounting element and a plurality of turbine blades attached to the mounting element. At least one of the turbine blades can include a root, a tip positioned opposite the root, and a leading edge spanning between the root and the tip along a length of the blade. The leading edge can have a length greater than a length of the root and a length of the tip. The at least one of the turbine blades can include a trailing edge positioned opposite the leading edge and spanning between the root and the tip along the length of the blade. The root can include a plurality of curved projections.

In some embodiments, the at least one of the turbine blades can have a radius of curvature along its length forming a concave face oriented away from the mounting element. The root and the tip can be rotated or twisted relative to each other such that the at least one of the turbine blades is twisted along its length. The mounting element can include a mounting plate having a central region and a plurality of arms extending outwardly from the central region. Each turbine blade can be supported by at least one of the plurality of arms. The wind turbine generator assembly can include a mounting flange configured to connect the mounting element to the generator. At least one of the mounting flange or the mounting element can include one or more nub elements configured to engage with one or more recesses on the other of the mounting flange or the mounting element. The wind turbine generator assembly can include a support structure configured to support the wind turbine and generator. The support structure can include a shaft, a first mounting assembly configured to receive a base of the shaft, and a second mounting assembly configured to support an intermediate portion of the shaft. At least one of the first mounting assembly or the second mounting assembly can include a sleeve attached to a plate, the sleeve being configured to receive the shaft. The at least one of the turbine blades can include high density polyethylene (HDPE).

In another representative embodiment of the present technology, a wind turbine can include a mounting element and a plurality of turbine blades. Each turbine blade can include a curved root positioned adjacent the mounting element, a tip positioned opposite the root, a leading edge spanning between the root and the tip along a length of the turbine blade, and a trailing edge spanning between the root and the tip opposite the leading edge. Each turbine blade can have a radius of curvature along its length to form a concave face oriented away from the mounting element. The root and the tip of each turbine blade can be rotated relative to each other such that each turbine blade is twisted along its length. Each turbine blade can be attached to the mounting element closer to the trailing edge of the turbine blade than to the leading edge of the turbine blade such that an intersection of the leading edge of each turbine blade and the root of each turbine blade projects upstream from the wind turbine. The root can include a plurality of tubercles distributed along the curvature of the root.

In some embodiments, each turbine blade of the plurality of turbine blades at least partially overlaps another turbine blade of the plurality of turbine blades. Each turbine blade can include high density polyethylene (HDPE). Each turbine blade can include one or more additive materials configured to inhibit UV radiation, stiffen the turbine blade, reduce brittleness, and/or color the turbine blade. In some embodiments, the wind turbine can include a mounting flange configured to connect the mounting element to a shaft of a generator. The root and the tip of a turbine blade can be rotated relative to each other by a washout angle of between 16 and 20 degrees. Each turbine blade can be attached to the mounting element via a generally flat region of the turbine blade.

In another representative embodiment of the present technology, a blade for a wind turbine can include an elongated and curved sheet having a curved root, a curved tip positioned opposite the root, a leading edge spanning between the root and the tip along a length of the blade, and a trailing edge spanning between the root and the tip opposite the leading edge. The root and the tip can be rotated relative to each other such that the blade is twisted along its length. The root can include an edge having a plurality of curved projections, the curved projections being distributed along a curvature of the root.

In some embodiments, a region of the blade adjacent the trailing edge can be generally flat. The blade can include one or more mounting holes configured to connect the blade to a mounting element. The blade can include high density polyethylene (HDPE). The root and the tip can be rotated relative to each other by a washout angle of between 16 and 20 degrees.

Other features and advantages will appear hereinafter. The features described above may be used separately or together, or in various combinations of one or more of them.

BRIEF DESCRIPTION OF THE DRAWINGS

In the drawings, wherein the same reference number indicates the same element throughout the views:

FIG. 1A illustrates a generally edge-on view of the turbine blade shown in FIG. 1.

FIG. 1B illustrates a schematic view of the root of a turbine blade employing tubercles in accordance with an embodiment of the present technology.

FIGS. 8 and 9 illustrate top and side views, respectively, of the mounting flange shown in FIG. 7.

FIG. 10 illustrates a side view of a flange for supporting a turbine in accordance with another embodiment of the present technology

DETAILED DESCRIPTION

Figure 1:
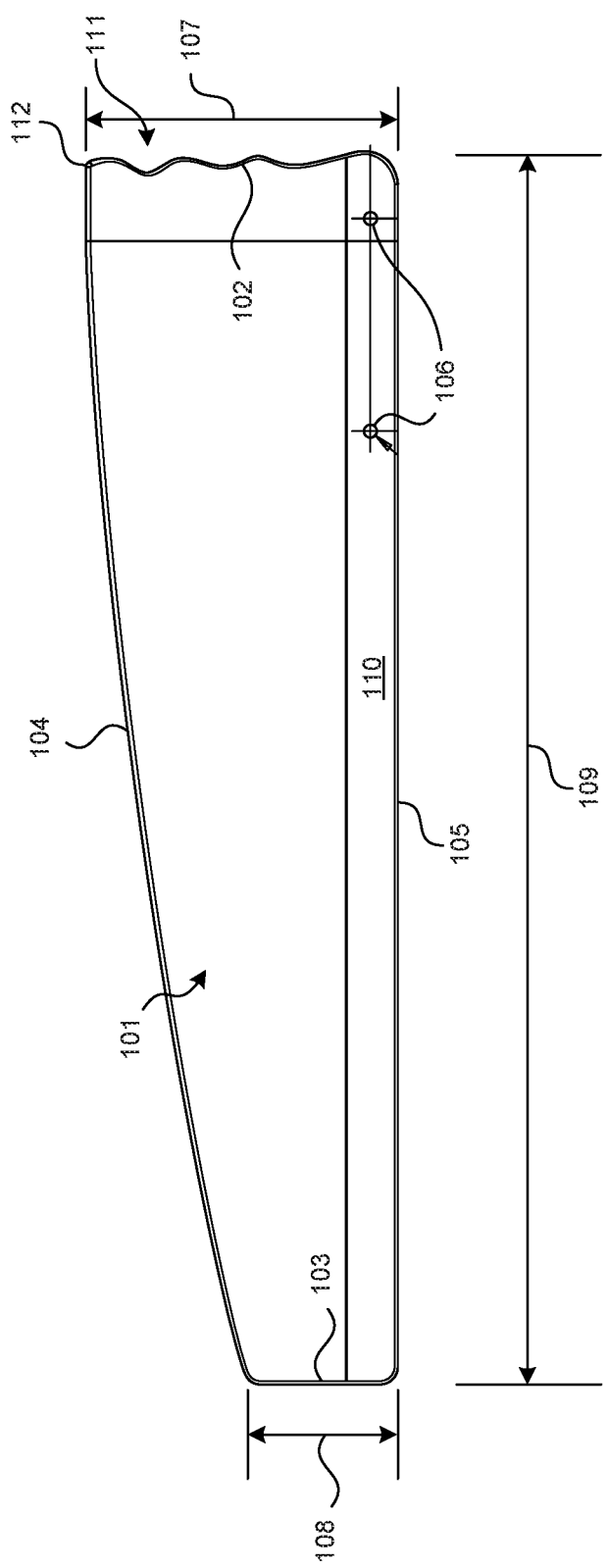
FIG. 1 illustrates a view of a turbine blade employing tubercles in accordance with an embodiment of the present technology.

The present technology is directed to a wind turbine blade, a wind turbine, a wind turbine generator assembly, and associated systems and methods. Various embodiments of the technology will now be described. The following description provides specific details for a thorough understanding and an enabling description of these embodiments. One skilled in the art will understand, however, that the invention may be practiced without many of these details. Additionally, some well-known structures or functions may not be shown or described in detail so as to avoid unnecessarily obscuring the relevant description of the various embodiments. Accordingly, the technology may include other embodiments with additional elements or without several of the elements described below with reference to FIGS. 1-18, which illustrate examples of the technology.

The terminology used in the description presented below is intended to be interpreted in its broadest reasonable manner, even though it is being used in conjunction with a detailed description of certain specific embodiments of the technology. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all of the items in the list, or (c) any combination of items in the list. Further, unless otherwise specified, terms such as "attached" or "connected" are intended to include integral connections, as well as connections between physically separate components.

Specific details of several embodiments of the present technology are described herein with reference to wind turbines. The technology may also be used in other areas or industries in which fluid flow is used to generate electricity and/or to rotate a turbine for other applications, including, for example, flow of a liquid. Conventional aspects of some elements of the technology may be described in reduced detail herein for efficiency and to avoid obscuring the present disclosure of the technology.

Wind Turbine Blade

The present technology includes a turbine blade that provides improved efficiency and high torque relative to its size.

As will be described in additional detail below, a turbine blade in accordance with an embodiment of the present technology may be formed from a curved sheet (such as a curved elongated quadrilateral sheet) which is also twisted and includes ridges or tubercles on a root or root edge for improved efficiency. In a representative embodiment, a blade may have between 16 and 20 degrees of twist (such as 18 degrees of twist), regardless of the overall size or length of the blade or other dimensions. The twist of a blade may be referred to as "washout." It can also be understood in part as the root and the tip of a blade being rotated or twisted relative to each other. The shape of each blade is designed to maintain even pressure distribution along the whole face of the blade. Such even pressure distribution and resistance to blade tip stall condition improves performance and reduces wind noise.

Turning now to the figures, FIG. 1 illustrates a view of a turbine blade 101 employing ridges, protuberances, or tubercles 111 in accordance with embodiments of the present technology. The blade can be generally shaped as a quadrilateral or elongated quadrilateral sheet with a root 102 on one side and a tip 103 opposite the root 102. A trailing edge 105, which may be straight in some embodiments (or curved in others), spans a distance or length 109 between the root 102 and the tip 103. A leading edge 104, which may be curved in some embodiments (or straight in others), is positioned opposite the trailing edge 105 and spans between the root 102 and the tip 103. A width 107 of the root 102 can be larger than a width 108 of the tip 103. For example, in a representative embodiment, the width 107 of the root 102 is approximately twice the width 108 of the tip 103. In other embodiments, the width 107 of the root 102 can have other suitable sizes relative to the width 108 of the tip 103.

One or more mounting holes 106 can be located along the trailing edge 105 near the root 102, or they may be positioned in other suitable locations for mounting the turbine blade 101 to a mounting element (such as a hub or other structure, as described in additional detail below). For example, the mounting holes 106 can have a diameter of 0.25 inches or another suitable diameter. The mounting holes 106 can be positioned at a distance of 0.5 to 0.6 inches (such as 0.5 inches) from the trailing edge 105. In an embodiment having two mounting holes, they can be spaced apart by 4.625 inches, or by any other suitable distance. They may be positioned a suitable distance away from the root 102. A region 110 of the blade 101 near and/or surrounding the mounting holes 106 can be flat in some embodiments to improve mounting and to help the blades 101 to have a suitable angle of attack against the incoming wind. For example, each blade 101 can be attached to the mounting element closer to the trailing edge 105 than to the leading edge 104 such that an intersection or intersection region 112 of the leading edge 104 and the root 102 of each blade 101 projects upstream from a mounting element of a wind turbine employing the blade 101 (see FIG. 7).

A turbine blade 101 in accordance with embodiments of the present technology can have a length 109 of approximately 15 inches to approximately 36 inches, or larger or smaller lengths depending on application and power generation needs. For example, in representative embodiments, a turbine blade 101 can have a length of 24.6 inches, 32.5 inches, or other suitable lengths. For a blade having a length 109 of 24.6 inches, the root 102 can have a width 107 of approximately 6.2 inches and the tip 103 can have a width 108 of approximately 4.7 inches. In further embodiments, the blade 101 can have a width 107 at the root 102 of approximately 8.5 inches, and a width 108 at the tip 103 of approximately 3.25 inches. For a blade having a length 109 of 32.5 inches, the root 102 can have a width 107 between approximately 8.0 and 8.6 inches (such as 8.56 inches) and the tip 103 can have a width 108 of approximately 3.25 inches. A turbine blade 101 in accordance with various embodiments can have other suitable dimensions. For example, a ratio of the length 109 of the trailing edge 105 to the width 107 of the root 102 to the width 108 of the tip 103 can be approximately 8:2:1. In a blade having a length of 32.5 inches, a radius of curvature of the leading edge 104 can be approximately 10 feet, or other suitable dimensions. Edges of the blade 101 can be chamfered or rounded to reduce drag, reduce weight, and/or for other reasons. For example, the leading edge 104, the trailing edge 105, and/or other edges can be chamfered or rounded. FIG. 1A illustrates a generally edge-on view of the turbine blade 101 shown in FIG. 1.

The inventors discovered that adding ridges or tubercles 111 to an edge, such as the edge at the root 102, improves efficiency. For example, in a wind turbine assembly such as embodiments of the technology described below, the root 102 functions like a leading edge cutting through airflow and guiding the airflow to wash out along the blade 101 from the root 102 to the tip 103. The tubercles 111 reduce flow separation (e.g., they delay boundary layer separation) along the blade 101, improving the transformation of wind force into rotational force for energy generation. The tubercles also increase the angle of attack at which stalling occurs, widening the airflow speed range in which the blades 101 are effective. The inventors discovered that the tubercles provided the most benefit along the edge at the root 102, as opposed to other regions of the blade 101. Testing revealed that blades 101 with tubercles 111 at the root 102 provide as much as 10 percent additional efficiency relative to blades without tubercles 111 in a typical windspeed range of 0 to 25 miles per hour. Such an increase in efficiency, combined with the efficiency provided by use of HDPE material in terms of cost and mechanical efficiency (described below), increase the feasibility of distributed wind systems. Although the tubercles 111 are described as such, the tubercles 111 may also be described as curved projections extending from, or forming part of, the root 102.

FIG. 1B illustrates a schematic view of a representative root end portion of the blade 101 (the root 102 is shown, along with a portion of the blade 101 adjacent to the root 102; the remainder of the blade 101 is omitted) having tubercles 111 in accordance with an embodiment of the present technology. FIG. 1B is a viewpoint from an upwind perspective. The inventors discovered that one efficient tubercle arrangement can be defined by, on one hand, amplitude of curvature, and on the other hand, distance along the curve of the root 102 from the trailing edge 105. For example, in a 32.5 inch blade, one tubercle 111 can be shaped to have an amplitude A1 of 1.2 inches, with a distance D1 between the trailing edge 105 and a maximum peak of the tubercle being approximately 0.7 inches. Moving from the trailing edge 105 toward the leading edge 104, another tubercle 111 can be shaped to have an amplitude A2 of 0.2 inches, with a distance D2 between the trailing edge 105 and a maximum peak of the tubercle being approximately 4.2 inches. Another tubercle 111 can be shaped to have an amplitude A3 of 0.2 inches, with a distance D3 between the trailing edge 105 and a maximum peak of the tubercle being approximately 6.0 inches. Another tubercle 111 can be shaped to have an amplitude A4 of 0.6 inches, with a distance D4 between the trailing edge 105 and a maximum peak of the tubercle being approximately 8.0 inches. Another tubercle 111 can be shaped to have an amplitude A5 of 0.7 inches, with a distance D5 between the trailing edge 105 and a maximum peak of the tubercle being approximately 10.1 inches. Note that the distances D1-D5 are distances along the arc or curvature of the root 102 (the curvature is visible, for example, in FIGS. 2A and 2B, described below).

In other embodiments, other suitable dimensions can be used. For example, the foregoing dimensions can be scaled up or down depending on the size of the blade 101, or the dimensions may be kept constant. Note that for purposes of illustration, the dimensions D1, D2, D3, D4, and D5 are provided as distances along the arc of the root 102. In some embodiments, the number of tubercles 111 may be between 9 and 11, while in a particular embodiment, as illustrated, there may be approximately 5 tubercles. In other embodiments, other numbers of tubercles may be used.

Figure 2A:
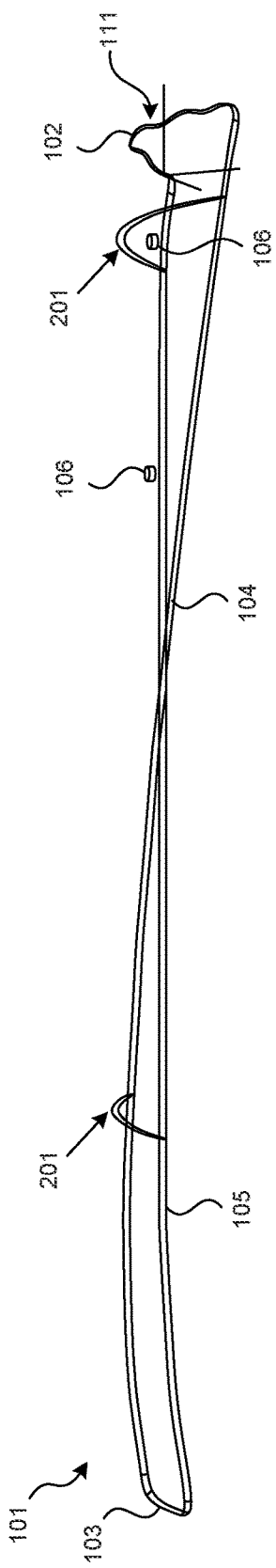
FIG. 2A is a partially schematic line or wire diagram to illustrate some of the curvature of the turbine blade shown in FIG. 1.
Figure 2B:
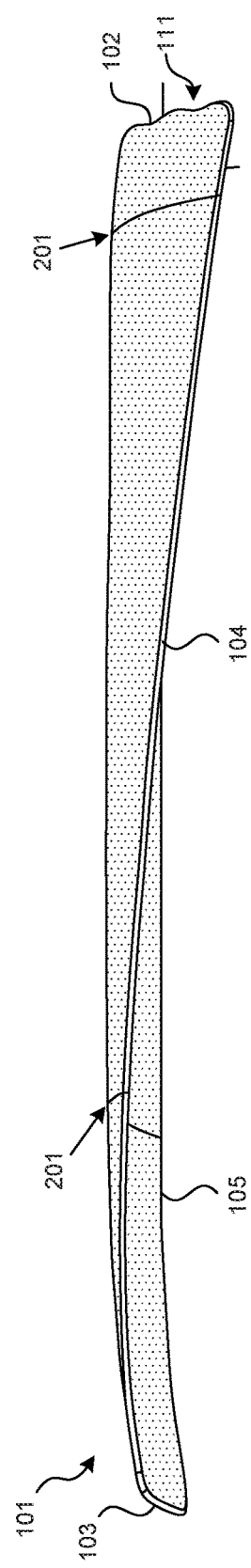
FIG. 2B is a partially schematic shaded view of the turbine blade shown in FIG. 1, with the same perspective as in FIG. 2A.

FIGS. 2A and 2B illustrate additional views of the turbine blade 101 shown in FIG. 1. FIG. 2A is a partially schematic line or wire diagram to illustrate some of the curvature of the turbine blade 101 shown in FIG. 1. FIG. 2B is a partially schematic shaded view of the turbine blade 101 shown in FIG. 1, with the same perspective as in FIG. 2A. In each of FIGS. 2A and 2B, as described above, the turbine blade 101 has a root 102, a tip 103 opposite the root 102, a leading edge 104 spanning between the root 102 and the tip 103, and a trailing edge 105 spanning between the root 102 and the tip 103. The mounting holes 106 are positioned along the trailing edge 105 and near the root 102. Lines 201 are provided to illustrate the curvature of the turbine blade 101 about a long or longitudinal axis (e.g., along or aligned with the length 109 shown in FIG. 1) running from the root 102 to the tip 103. For example, the blade 101 can be curved about an axis extending from the root 102 to the tip 103 between the leading edge 104 and the trailing edge 105. In other words, the radius of curvature is generally oblique to the length of the blade 101 or transverse to the length of the blade 101 (such as perpendicular). In a representative embodiment, such as in a 32.5 inch blade, a radius of curvature of the lines 201 can be about 7 inches, or it can have other suitable dimensions. In a representative embodiment, the turbine blade 101 can have a parabolic shape and a curvature at an apex of a parabola or centerline of the blade can be 7 inches. In some embodiments, the radius of curvature need not be uniform along the length 109 from the root 102 to the tip 103. In a further representative embodiment, the turbine blade 101 is twisted ("washout") about an axis running the length of the turbine blade 101, such as a centerline, by 18 degrees, as further illustrated in FIG. 3. Such a compound curve provides structural integrity while distributing even wind pressure across the face of the blade 101. The tubercles 111 further improve efficiency relative to blades without such tubercles, as described above.

Figure 3:
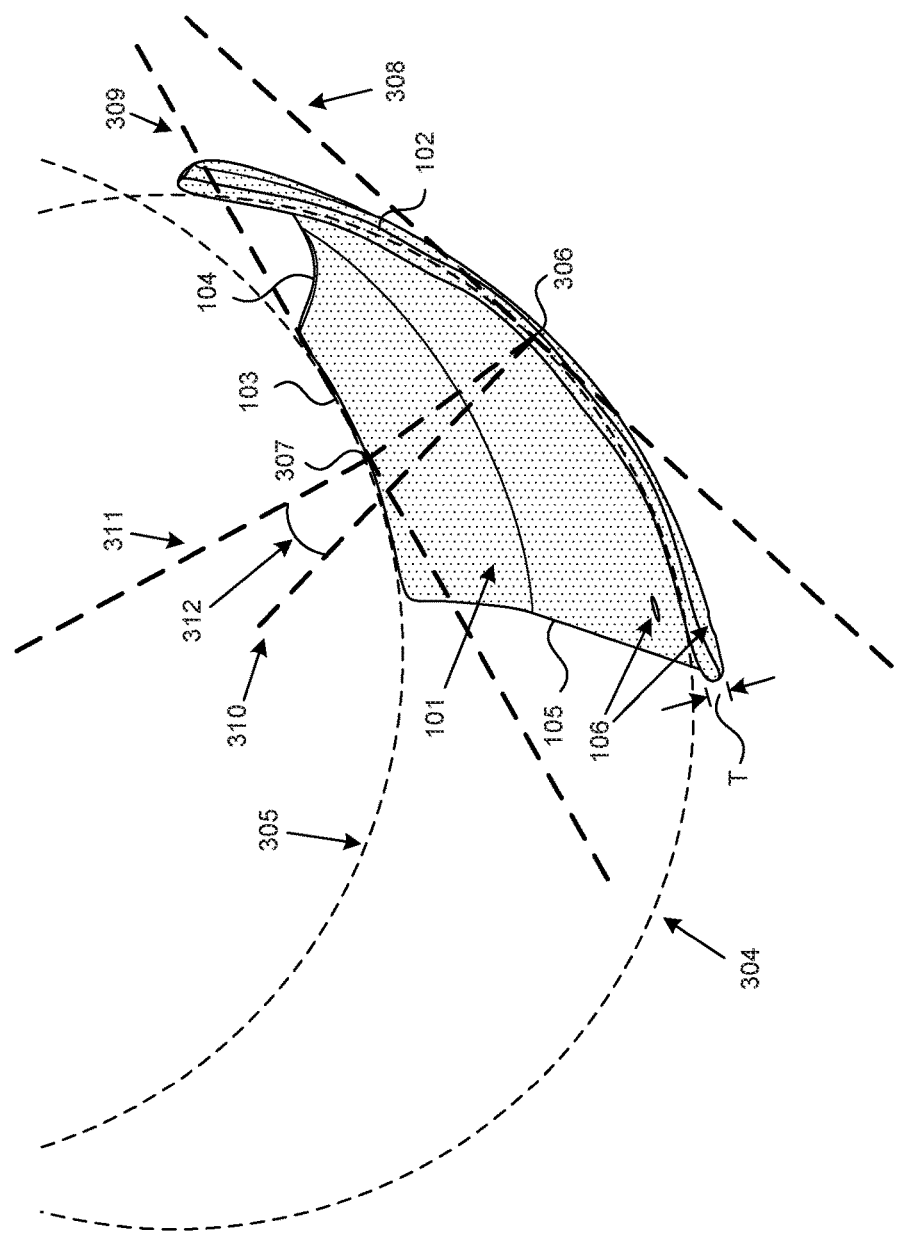
FIG. 3 illustrates an end view of a turbine blade, with a root in the foreground, extending to a tip in the background, in accordance with an embodiment of the present technology.

FIG. 3 generally illustrates an end view of the turbine blade 101 shown in FIGS. 1, 1A, 2A, and 2B, with the root 102 in the foreground, extending to the tip 103 in the background. Note that tubercles (for example, tubercles 111 described above) are not shown in FIG. 3 for simplicity of illustration. A curvature 304 of the root 102 is depicted as a dashed line (304). A curvature 305 of the tip 103 is also depicted as a dashed line (305). In a representative embodiment (such as a blade having a length of 32.5 inches), the radius of the curvature 304 of the root 102 and the radius of the curvature 305 of the tip 103 is approximately 7 inches. In other embodiments, the radius of the curvatures 304 and 305 may be different, or the 7-inch curvature can be used with other lengths of blades. For example, the radius of curvature 305 of the tip 103 and/or the radius of curvature 304 of the root 102 may be between approximately 3 inches and 7 inches on blades of various lengths. The blade 101 can have a thickness T in the range of 3 millimeters to 6 millimeters, for example, or it may have another suitable thickness. The thickness T can be uniform across the blade 101 or it can vary in different regions of the blade 101.

The inventors discovered that uniform thickness (for example, 0.174 inches when using HDPE material described below) provides optimal efficiency and performance. Uniform thickness can be achieved using injection molding, for example. The thickness of the blades can be controlled using injection molding so that, for example, longer blades may have increased thickness relative to shorter blades. When the blade has generally uniform thickness, several benefits are realized. For example, manufacturing is simplified. When the material thickness is uniform, the material heats and cools at approximately the same rate, which resists or prevents warping. In some embodiments, however, the blade thickness T can vary (e.g., it may be tapered from the root 102 to the tip 103). In some embodiments, the thickness T can vary such that the blade is thickest in the area closest to the mounting holes 106 and it becomes progressively thinner from there toward the other edges and other regions of the blade.

In a representative embodiment, the turbine blade 101 has a parabolic shape. For example, the curvature 304 and/or 305 may be parabolic. In such embodiments, the radius of curvatures 304 and/or 305 can be measured at a center point or vertex of such a parabolic shape, at a central point along the root 102 or the tip 103.

FIG. 3 also illustrates the twist, or washout, of the blade 101. The twist can be measured by an angle 312 between a first line 310 and a second line 311, which can be explained as follows. A first center point 306 of the root 102 is positioned between the leading and trailing edges 104, 105. A first tangent line 308 is tangent to the curvature 304 of the root 102 at the first center point 306. The first line 310 is perpendicular to the first tangent line 308 at the first center point 306. Similarly, a second center point 307 of the tip 103 is positioned between the leading and trailing edges 104, 105. A second tangent line 309 is tangent to the curvature 305 of the tip 103 at the second center point 307. The second line 311 is perpendicular to the second tangent line 309 at the second center point 307. The first line 310 and the first tangent line 308 define a first plane. The second line 311 and the second tangent line 309 define a second plane parallel to the first plane. The angle 312 is the angle between the first line 310 projected onto the second plane (defined by the second line 311 and the second tangent line 309) and the second line 311. The angle 312, representing the twist or "washout" can be between 16 and 20 degrees in some embodiments.

In a representative embodiment of the present technology, the angle 312 can be 18 degrees. The 18 degree washout resists (e.g., prevents) negative blade tip stall condition and keeps positive wind pressure on the correct side of the tips at the widest range of wind speeds. Computational fluid dynamics analysis and wind tunnel testing revealed that the 18 degree washout angle yields approximately 9% ore energy relative to a blade having a 16 degree washout angle. Accordingly, the geometry of the blade 101 contributes to performance of a turbine using the blade 101, especially with regard to improved efficiency.

In various embodiments according to the present technology, the twist (i.e. washout or angle 312) is 18 degrees regardless of the length (e.g., length 109, see FIG. 1) of the blade 101. For example, when embodiments of the present technology are scaled up or down (such as relative to a representative length of 32.5 inches) while maintaining washout of 18 degrees, the additional length of a blade 101 does not merely become excess weight and/or surface area for drag. Rather, generally the entire face of the blade contributes substantially to providing torque for a turbine assembly of suitable sizes larger and smaller than those disclosed herein.

A blade 101 or a plurality of blades 101 according to the present technology maintain even pressure distribution along the whole face of the blade as it receives an incoming airstream or wind. Benefits to such geometric designs and pressure distribution include higher performance, increased efficiency, and reduced noise (e.g., silent or almost silent) relative to conventional turbines and/or turbine blades.

In some embodiments, a blade 101 is made of lightweight polymeric material and is especially shaped to accommodate the use of such material. In a representative embodiment, the blade 101 is made from a thermoplastic such as high density polyethylene (HDPE). In some embodiments, the shape of the blade 101 accommodates such a flexible material to provide the stiffness required of a wind turbine blade. For example, under extremely high wind conditions, a turbine can be designed to flip (i.e. rotate around to face away from the wind) and the blade will flex to avoid destruction of the turbine. In other words, under normal operation, wind pushing on the front of a blade 101 will induce torque in the blade 101, which is generally stiff in that direction as a result of its curvature. But when the blade 101 receives pressure on its reverse side (the side not normally facing into the wind), it can flex, without breaking, and return to shape after the wind has diminished. Further, the flexibility of HDPE helps manage overspeed or over-revving in storms or extremely high wind conditions by slightly pitching into the wind and reducing the angle of attack (and thereby reducing the torque and speed to keep them within safe levels). In a representative embodiment of the present technology, high molecular weight HDPE can be used to form the blade (for example, hexene copolymer HDPE blow molding resin). Advantages of HDPE include properties resistant to extreme temperature change and flexibility with reduced risk of fracture, as well as relatively low cost compared to metals or composites.

In some embodiments, the material used to make the blade 101 (such as HDPE) can include one or more additives for protection from ultraviolet (UV) radiation (such as a UV inhibitor), one or more additives to reduce brittleness, one or more additives to modify the color of the finished blade 101, one or more additives to improve stiffness (such as nylon), and/or other additives suitable for providing desired aesthetic and/or functional qualities.

In other embodiments, the blade is made from a fiber reinforced plastic (which may be HDPE or another plastic material). One non-limiting example of such a material is a composite employing carbon fibers and/or glass fibers in an epoxy base. Such composites have demonstrated exceptional strength and durability combined with light weight for demanding applications in the automotive, medical and industrial industries. Additionally, these composites are relatively easy to form into precise, complex shapes without the need for precision stamping or milling operations. Another non-limiting example of a fiber reinforcement material may include nylon fibers.

In yet further embodiments, other suitable materials may be used to form all or a part of the blade 101, such as PVC (polyvinyl chloride), ABS (acrylonitrile butadiene styrene), silicone, fiberglass, wood, composite structures formed from wood or other suitable layers, and/or various types of polymers or plastics, such as polypropylene. However, high molecular weight HDPE functions best in terms of flexibility, resistance to failure, and maintaining properties across a wide temperature range.

Figure 4:
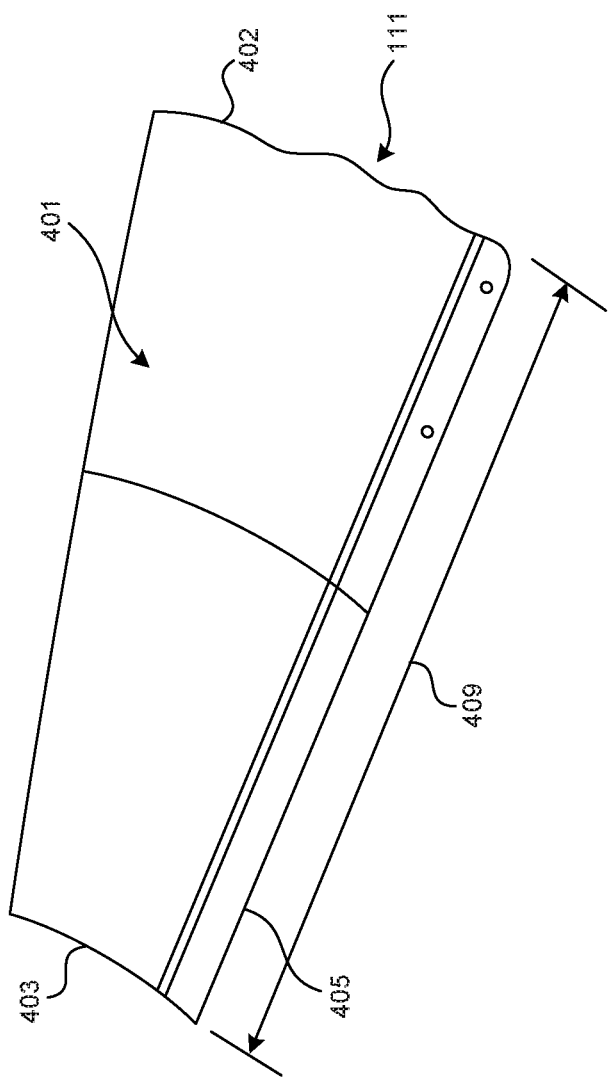
FIG. 4 illustrates a view of a turbine blade in accordance with another embodiment of the present technology.

FIG. 4 illustrates a view of a turbine blade 401 in accordance with another embodiment of the present technology. The turbine blade 401 may be generally similar to the turbine blade 101 described above with regard to FIGS. 1-3, having a root 402, a tip 403, and a trailing edge 405, for example. The turbine blade 401 can have a length 409 between the root 402 and the tip 403 of 24.4 inches. The turbine blade 401 can include tubercles 111 similar to those described above with regard to FIGS. 1-2B, for improved efficiency.

Turbine Including Mounted Array of Blades

The present technology also includes a turbine made with a mounted array of turbine blades, such as the turbine blade 101 (or the turbine blade 401) described above with respect to FIGS. 1-4.

Figure 5:
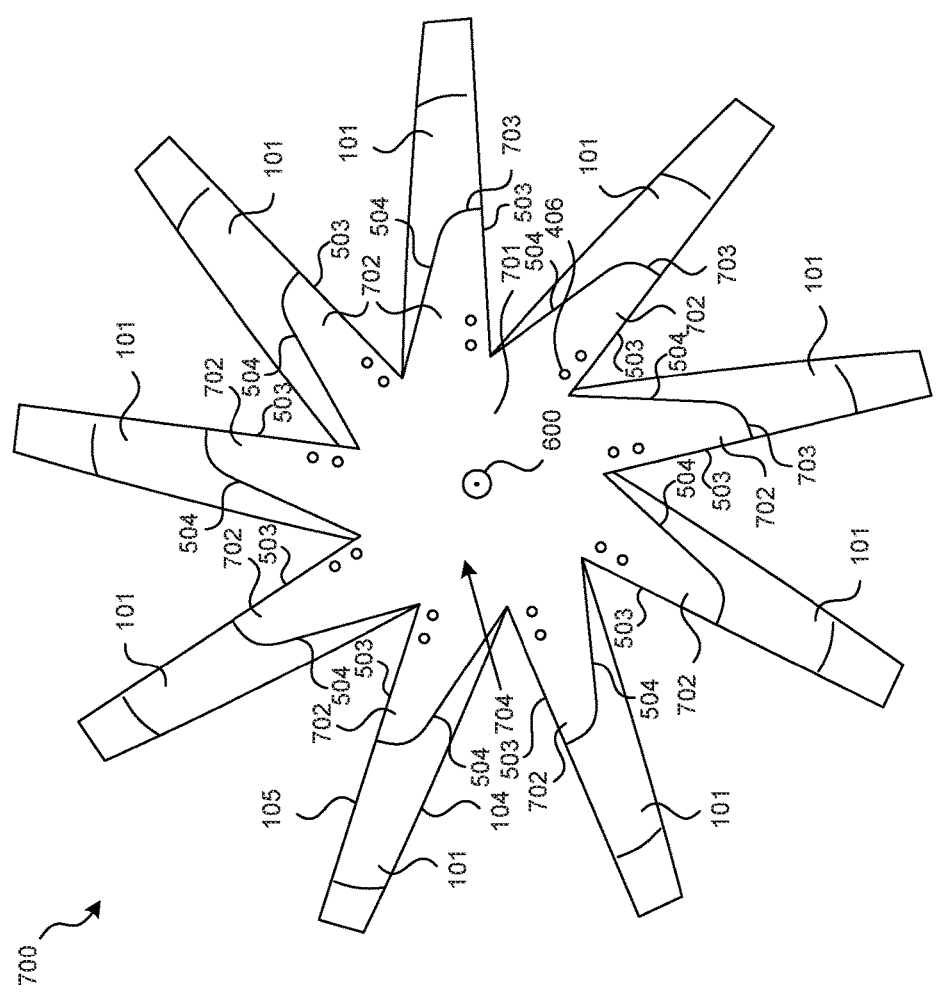
FIG. 5 illustrates a rear view of a turbine constructed using the turbine blades shown in FIG. 1 in accordance with an embodiment of the present technology, in which the turbine blades and a mounting plate are visible.

FIG. 5 illustrates a partially schematic rear view of a turbine 700, in which a plurality of turbine blades 101 are mounted to a mounting plate 701 via mounting holes 406 of the mounting plate 701. Such a view is looking upstream and at the convex sides of the blades 101. The rear side of the mounting plate 701 can include a recess 600 to receive a drive shaft associated with a generator, described in further detail below. For illustration, the leading edge 104 and the trailing edge 105 of one of the blades 101 are indicated. Although 9 blades 101 are illustrated, any suitable number of blades can be used in accordance with various embodiments of the present technology.

The mounting plate 701 is a generally flat star- or circular-shaped plate including a flat circular central region 704 and one or more tapered arms 702 (for example, 9 tapered arms 702 or a suitable number of tapered arms to correspond with the number of blades 101). The tapered arms 702 radiate outwardly from the central region 704. The arms are arranged symmetrically about the central region 704 with corresponding rounded or curved tips 703 of the arms (at the end of each arm 702) being narrower than the base portion or attachment point connecting the arm 702 to the central region 704. The rounded tips 703 provide improved efficiency relative to non-rounded tips due to the corresponding reduction in material and weight. The arms need not be tapered in some embodiments. Note that for the purposes of illustration, not every element is labeled in FIG. 5. The reader will understand that the mounting plate 701 is symmetric and elements are repeated around the mounting plate 701 several times. The mounting plate 701 can have an overall width between 15 inches and 18 inches (for example, it may be sized such that an imaginary circle contacting each of the tips 703 has a diameter between 15 inches and 18 inches), or it can have other suitable dimensions.

Each arm 702 includes a first edge 503 and a second edge 504 opposite the first edge 503. The mounting holes 406 are positioned near the first edge 503. The mounting holes 406 are positioned to align with corresponding mounting holes on the turbine blades described above (for example, mounting holes 106 in the turbine blades 101 described above with respect to FIGS. 1-3). When the mounting holes on the turbine blades are mated with the mounting holes 406 on the mounting plate 701, the trailing edge of each turbine blade (for example, the trailing edge 105 of the turbine blade 101 described above with respect to FIGS. 1-3) aligns with the first edge 503 of the mounting plate 701. Bolts with nuts can be used to mount, clamp, or connect the turbine blades 101 to the mounting plate 701. Other suitable fasteners, such as rivets, pins, or clips, can additionally or alternatively be used to mount the turbine blades 101 to the mounting plate 701. Once connected, the location of the mounting holes 406 results in a stiffening of the blades 101 along the trailing edge 105.

In various embodiments, the mounting plate 701 is formed from a stiff material such as steel or plastic. In other embodiments, the mounting plate 701 can be formed from a variety or combination of materials suitable to support turbine blades and carry loads to transfer torque to a generator. For example, the mounting plate 701 can be formed from steel with a thickness between 3/16 of an inch and 0.5 inches, or other suitable dimensions depending on material, implementation, and blade size. In a representative embodiment, the mounting plate 701 is 3/8 of an inch thick. One or more bolts (not shown) pass through the turbine blades 101 and the mounting plate 701 to secure the turbine blades to the mounting plate 701. In other embodiments, other suitable fasteners can be used.

Figure 6:
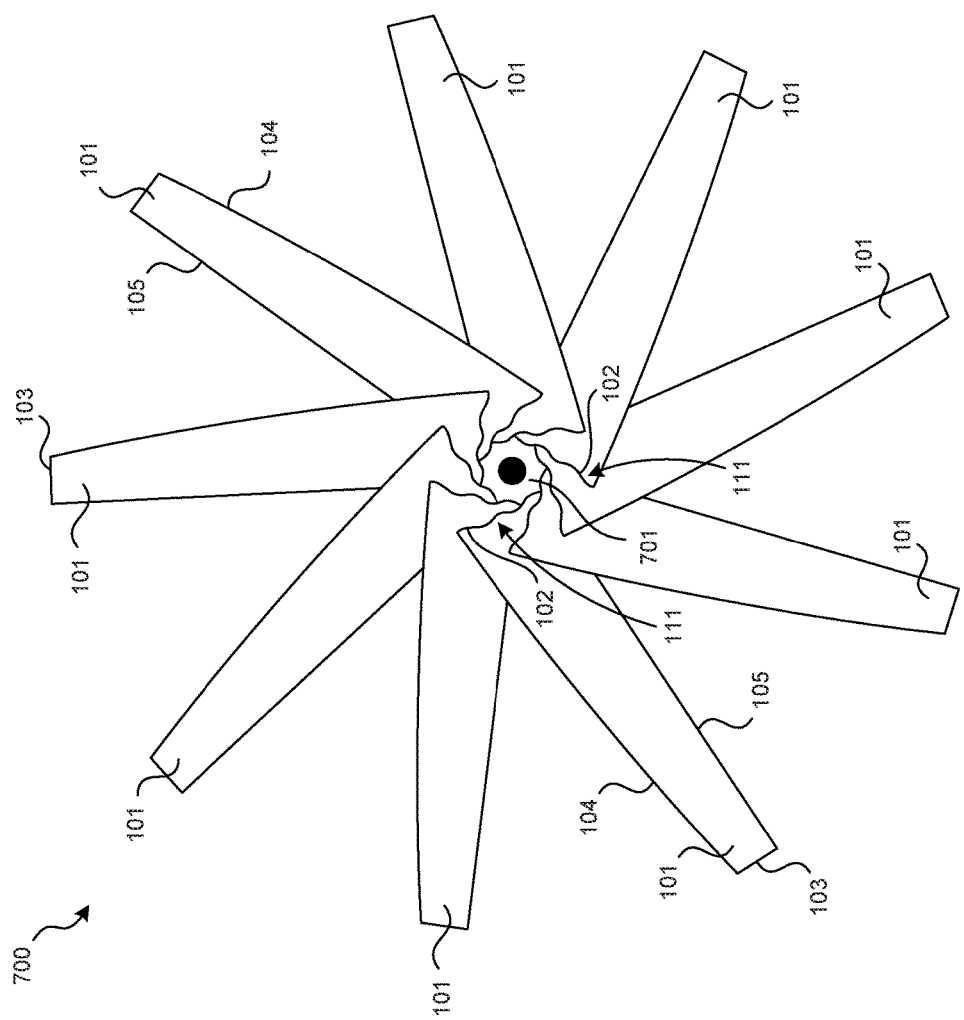
FIG. 6 illustrates a front view of the turbine shown in FIG. 5.

FIG. 6 generally illustrates a partially schematic front view of the turbine 700 (looking downstream). The tubercles 111 are visible at the root 102 of each blade 101. When assembled into a turbine 700, the blades 101 can be spaced apart and symmetrically overlapping, such that a leading edge 104 of each blade overlaps its neighboring blade 101. The symmetrical pattern also results in all the tips 103 of the blades 101 being equidistant apart and equidistant from a center of the turbine 700. The curvature of the blades 101 is such that the blade faces are concave in the view of FIG. 6. The convex sides opposite the blade faces are positioned toward the mounting plate 701 and downstream of normal wind during use (the concave faces resist bending backwards away from the wind during normal operation).

In some embodiments of the present technology, the mounting plate 701 connects (directly or indirectly) to a generator or alternator to create electricity from rotation due to the wind. For example, FIG. 7 generally illustrates a side view of a turbine (such as a turbine 700 described above with respect to FIGS. 5-6), in which the turbine is attached to a drive shaft 800 via a mounting flange 801. The drive shaft 800 connects to an alternator, generator, or other suitable device for converting rotation to electrical energy. The flange 801 can limit or even prevent bending or other damage to the mounting plate 701 and/or the drive shaft 800 from the stress applied by incoming wind against the blades 101 by spreading the load applied to the mounting plate 701 and/or the drive shaft 800. The drive shaft 800 can have a diameter of approximately 3/4 inch, depending on implementation.

Figure 7:
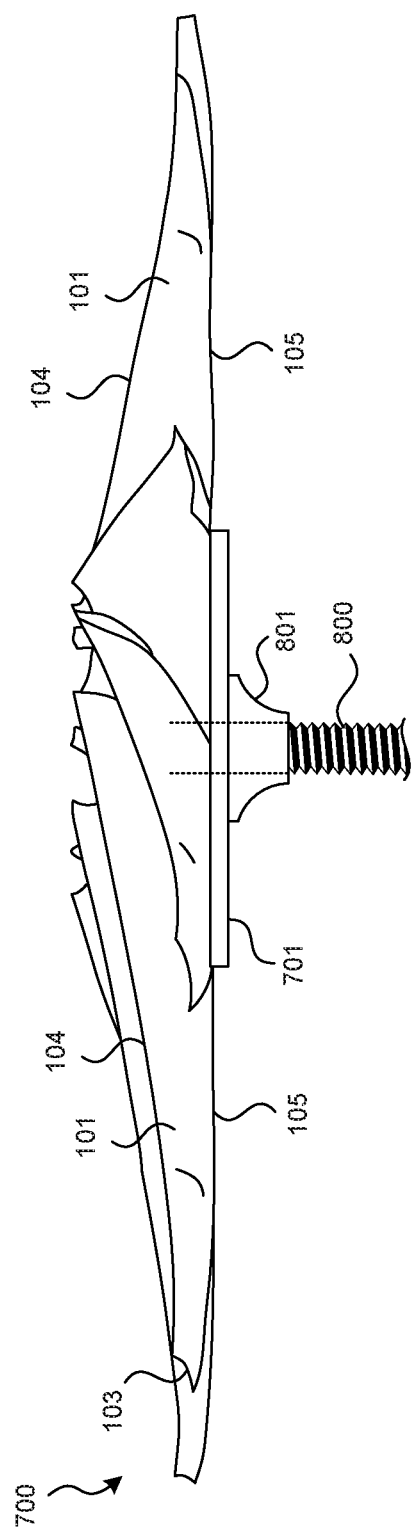
FIG. 7 illustrates a side view of a turbine (such as a turbine shown in FIGS. 5-6), in which the turbine is attached to a generator drive shaft via a mounting flange.

FIGS. 8 and 9 generally illustrate partially schematic top and side views, respectively, of the mounting flange 801 connected to the drive shaft 800 shown in FIG. 7. The mounting flange 801 can have an overall diameter 900 between 2 and 3 inches, for example, 2.25 inches, or other suitable dimensions. In some embodiments, a larger mounting flange 801 can be used to support larger mounting plates (such as the mounting plate 701 described above) and/or in conjunction with larger blades (such as the blades 101 described above). It can have a central bore 901 having a diameter suitably sized to receive the drive shaft 800. In a representative embodiment, the flange 801 can include one or more threaded bores 902 (for example, four equally spaced-apart bores 902) offset from the rotational axis for receiving bolts or other suitable fasteners to fasten the turbine 700 (via the mounting plate 701) to the flange 801 and the drive shaft 800. Such bores and fasteners help ensure that the flange 801 and the mounting plates (and thereby, the turbine 700) rotate together without relative movement amongst themselves. They also help maintain concentricity and axial alignment. Resisting such relative movement (e.g., slippage) and maintaining axial alignment aids in reducing wear, vibration, and noise, for example. In other embodiments, one or more nub elements 903 may be positioned on the flange 801 or on the mounting plate (or both), with corresponding recesses positioned on the other of the flange 801 or the mounting plate. For example, as illustrated in FIGS. 8 and 9, three nub elements 903 can be symmetrically spaced and equidistant from a center axis of the flange 801. In general, corresponding protrusions on either the flange 801 or the mounting plate (such as mounting plate 701), offset from the center and away from the rotational axis, can be positioned to mate with corresponding recesses to prevent or at least resist relative rotation and to help distribute the load from the turbine to the drive shaft.

With reference to FIG. 9, the flange 801 can be tapered from the larger outer diameter contacting the mounting plate toward the narrower diameter facing away from the mounting plate (and toward the drive shaft 800 and generator). For example, a lip 1000 may be formed at the plate-end of the flange 801, and it may have a thickness 1001 of approximately 1/8 inch, or other suitable dimensions. At the other end of the taper, near the drive shaft 800, the material thickness 1002 of the flange 801 can be approximately 1/8 inch, or another suitable thickness. In some embodiments, a portion 1003 of the drive shaft 800 can protrude out of the flange 801 (for example, by 1/4 inch or another suitable amount) such that it mates with the corresponding indentation in a mounting plate (for example, recess 600 described above with respect to FIG. 6). Such a protrusion by the drive shaft 800 helps maintain concentricity and centering of turbine 700 relative to the flange 801 (and thereby, concentricity with the rotational axis of a corresponding generator)

to reduce noise, vibration, wear, and other problems that would otherwise result from a lack of concentricity or axial alignment.

FIG. 10 illustrates a side view of a flange 1100 in accordance with another embodiment of the present technology. The flange 1100 is generally similar to the flange 801 described above with respect to FIGS. 8 and 9, but without a tapered profile. Such a flange 1100 can still employ similar fastening and anti-rotation elements (bolts or nubs) as described above for the flange 801.

Wind Turbine and Generator Assembly

One representative advantage of blades 101 in accordance with the present technology is that they produce high torque relative to their profile and size. Accordingly, blades 101 and turbines (such as a turbine 700 described above with respect to FIGS. 5-7) in accordance with the present technology can be used in many remote or dedicated applications, such as cabins, camp sites, boats, remote environmental monitors, etc. Small wind turbines and electric generators powered by small wind turbines can be environmentally sound and economically attractive alternatives to conventional sources of energy. Representative blades and turbines in accordance with the present technology have improved efficiency for converting mechanical energy derived from the wind into electrical energy and they are able to operate in both low wind and high wind conditions with reduced (e.g., minimal) noise. Various wind turbines according to the present technology can have an outer diameter of 24 inches to 80 inches, or other suitable dimensions, depending on application and need for portability.

In various embodiments, turbines, generators, and associated assemblies can be installed in various locations, including permanent or semi-permanent locations. For example, FIG. 11 illustrates an isometric view of a wind turbine generator assembly 1300 mounted to a rooftop 1310 and supported against a parapet wall 1320, in accordance with another embodiment of the present technology.

Figure 11:
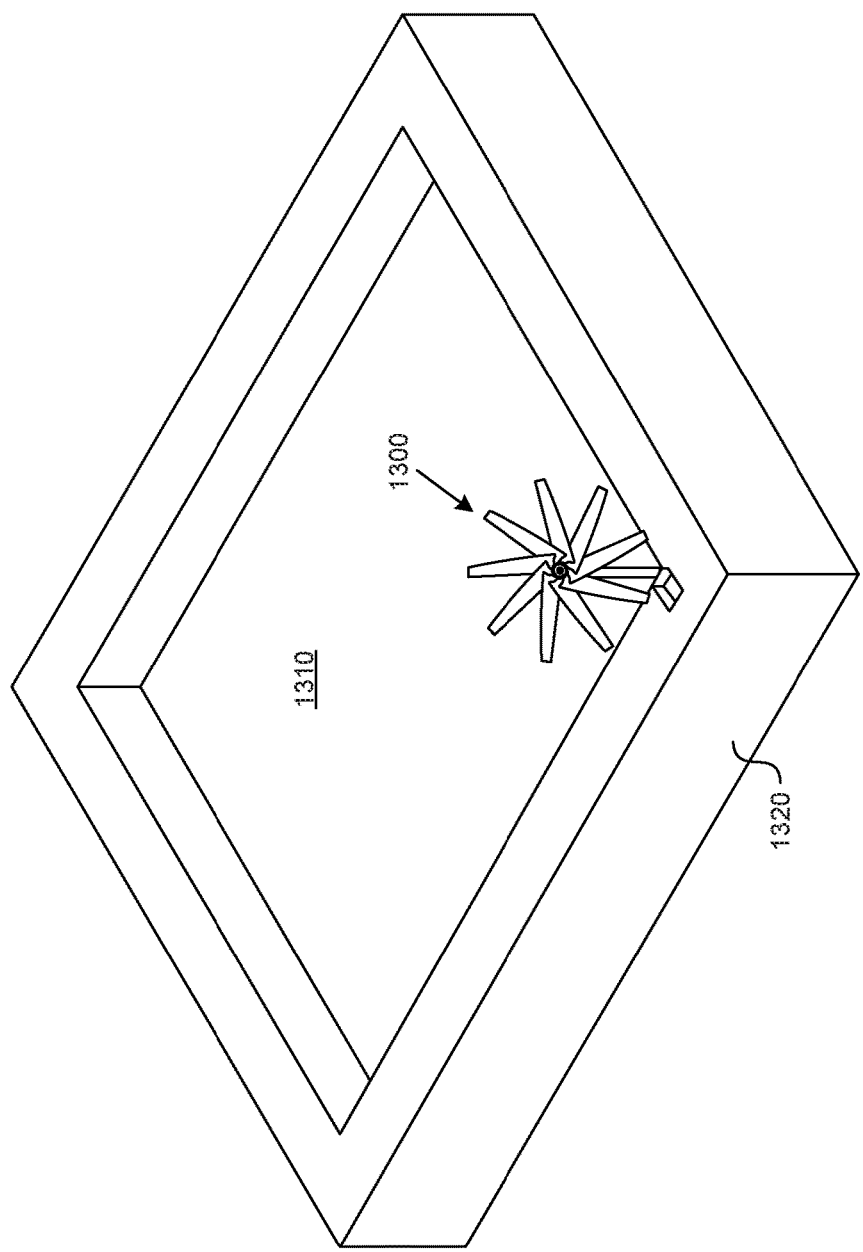
FIG. 11 illustrates an isometric view of a wind turbine generator assembly positioned on a rooftop and supported against a parapet wall, in accordance with an embodiment of the present technology.
Figure 12:
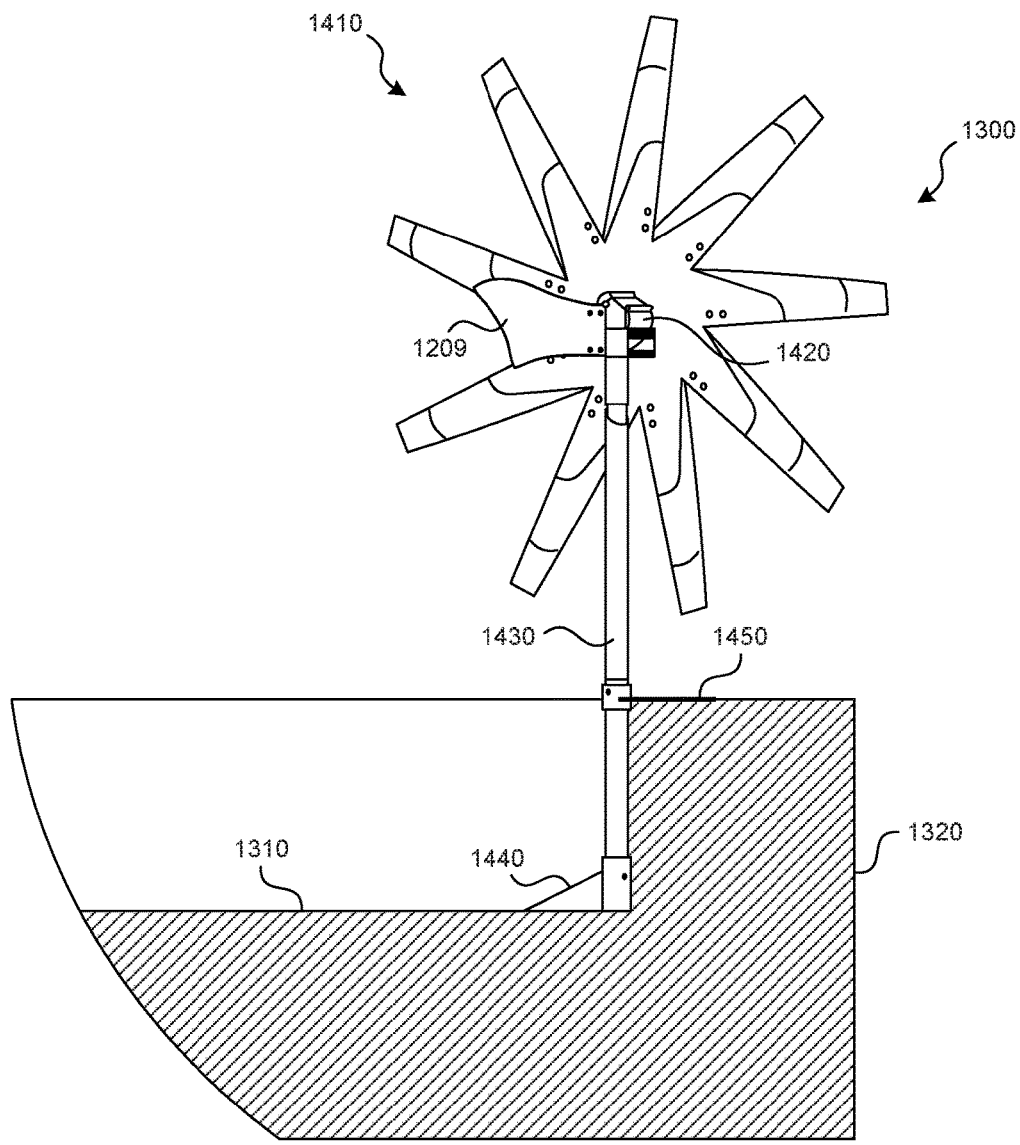
FIG. 12 illustrates a view of the wind turbine generator assembly shown in FIG. 11, mounted to the rooftop and supported against the parapet wall in accordance with an embodiment of the present technology.

FIG. 12 illustrates another view of the wind turbine generator assembly 1300 shown in FIG. 11, mounted to the rooftop 1310 and supported against the parapet wall 1320 in accordance with an embodiment of the present technology. A turbine 1410 (which can be similar to the turbine 700 described above with respect to FIGS. 5-7, or other turbines according to embodiments disclosed herein) can be connected to a generator 1420, which can in turn be rotatably connected to a support shaft 1430 (to turn with the breeze, for example). The support shaft 1430 can be secured to the rooftop 1310 and the wall 1320. For example, a rooftop mounting assembly or rooftop mount 1440 can secure a base of the shaft 1430 to the rooftop 1310. A parapet mount assembly or parapet mount 1450 can secure a middle region or intermediate portion of the support shaft 1430 to the parapet wall 1320. Such an embodiment can be implemented on various rooftops, including small residential rooftops, large residential rooftops, commercial rooftops, industrial site rooftops, or any other suitable area, including non-rooftop areas such as boundary walls or fences. Note that in some embodiments, guy wires or other additional support structures may optionally be omitted. In further embodiments, the shaft 1430 includes a plurality of telescoping shafts to facilitate raising and/or lowering the turbine 1410 and generator 1420. An optional fin 1209 is also illustrated. Such a fin 1209 can aid in pointing the turbine 1410 into the wind.

Figure 13:
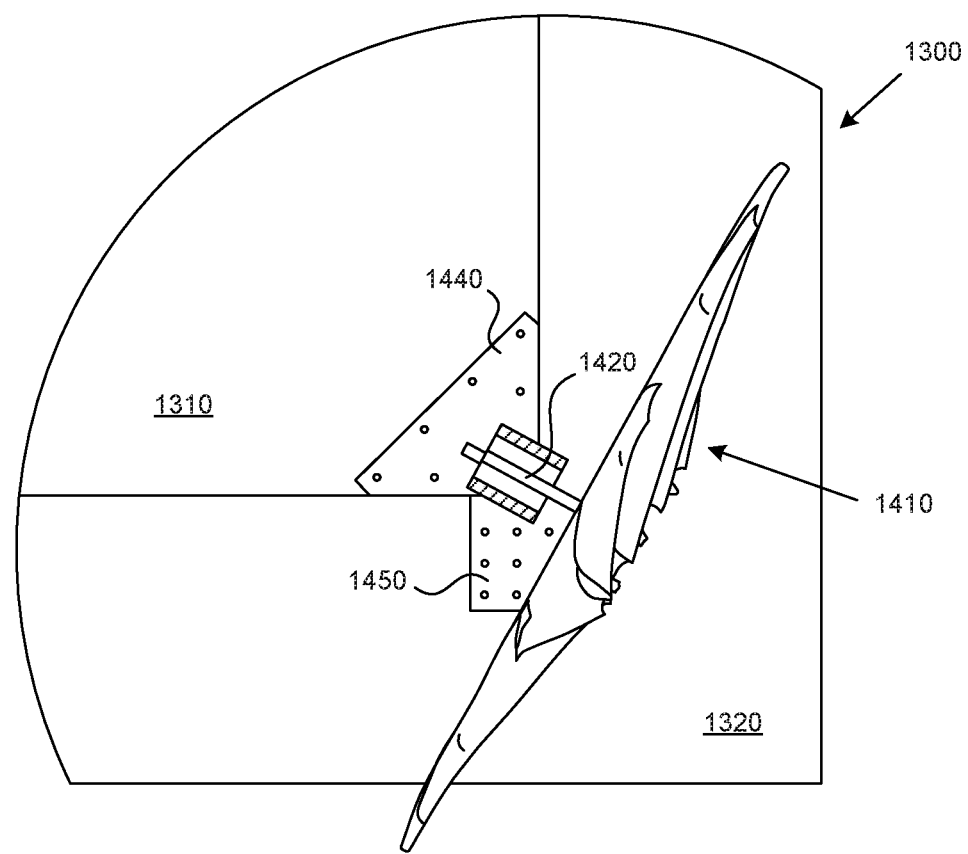
FIG. 13 illustrates a top view (looking downward) of the wind turbine generator assembly shown in FIG. 11, mounted to the rooftop and supported against the parapet wall in accordance with an embodiment of the present technology.

FIG. 13 illustrates a top view (looking downward) of the wind turbine generator assembly 1300 shown in FIG. 12, mounted to the rooftop 1310 and supported against the parapet wall 1320 in accordance with an embodiment of the present technology. The turbine 1410 and the generator 1420 are also shown. The rooftop mount 1440 and the parapet mount 1450 can be formed as brackets, plates, or other suitable attachment points to hold the shaft 1430 (not visible) to the wall 1320 and/or rooftop 1310.

Figure 14:
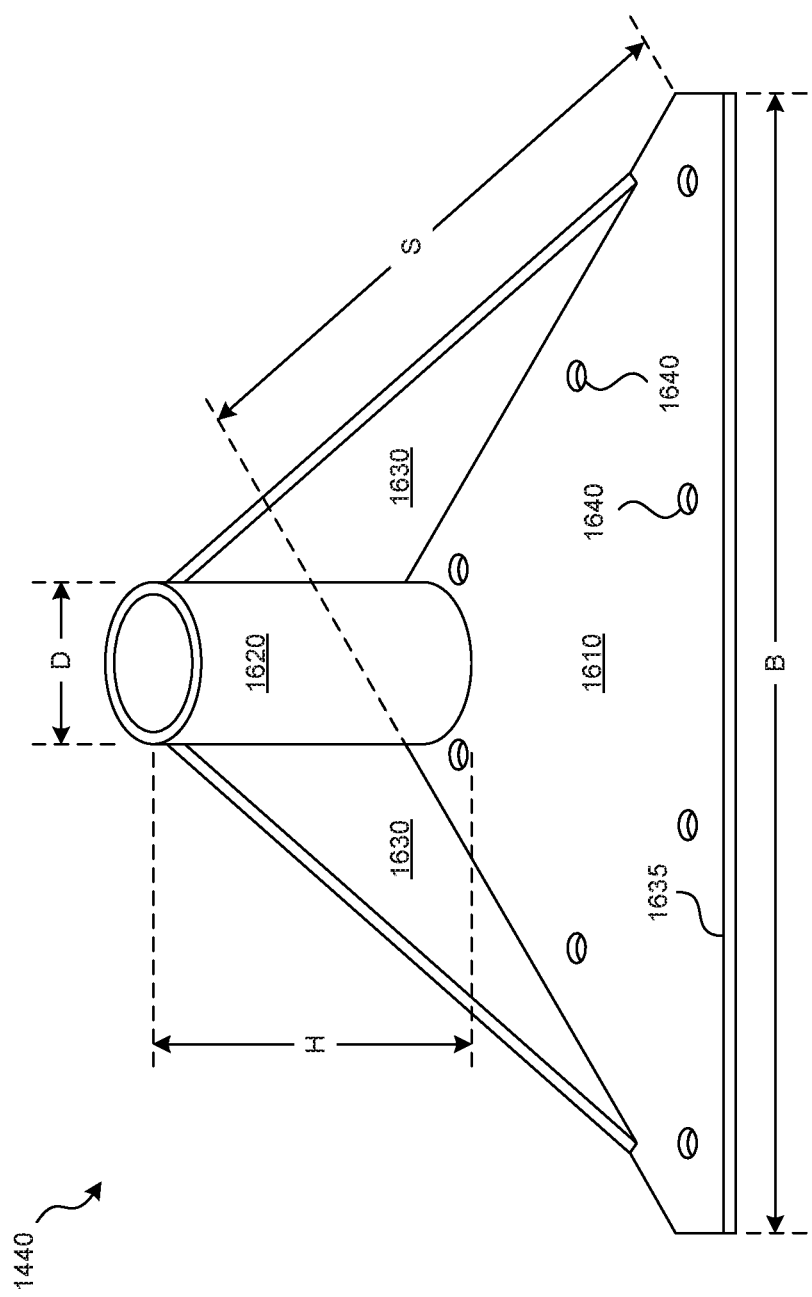
FIG. 14 is an isometric view of the rooftop mount shown in FIGS. 12 and 13 in accordance with an embodiment of the present technology.

FIG. 14 is a view of the rooftop mount 1440 shown in FIGS. 12 and 13 in accordance with an embodiment of the present technology. The rooftop mount 1440 can be formed from a generally triangular base plate 1610, a cylinder or sleeve 1620 connected perpendicularly to the base plate 1610 to receive the shaft 1430 (not shown), and one or more orthogonal support plates 1630 (for example, two plates 1630). The base 1635 of the triangular base plate 1610 can be positioned away from a corner of a parapet wall (1320, not shown). The base plate 1610 can include one or more mounting holes 1640 through which a bolt or other faster can be passed to mount the rooftop mount 1440 to the rooftop 1310 (FIG. 13). In some embodiments, the base plate 1610 can have a base length B of 20.8 inches and a side length S of 14.0 inches, for example. The sleeve 1620 can have a height H of 6 inches and an outer diameter D of 3 inches. In other embodiments, the rooftop mount 1440 can have other suitable dimensions.

Figure 15:
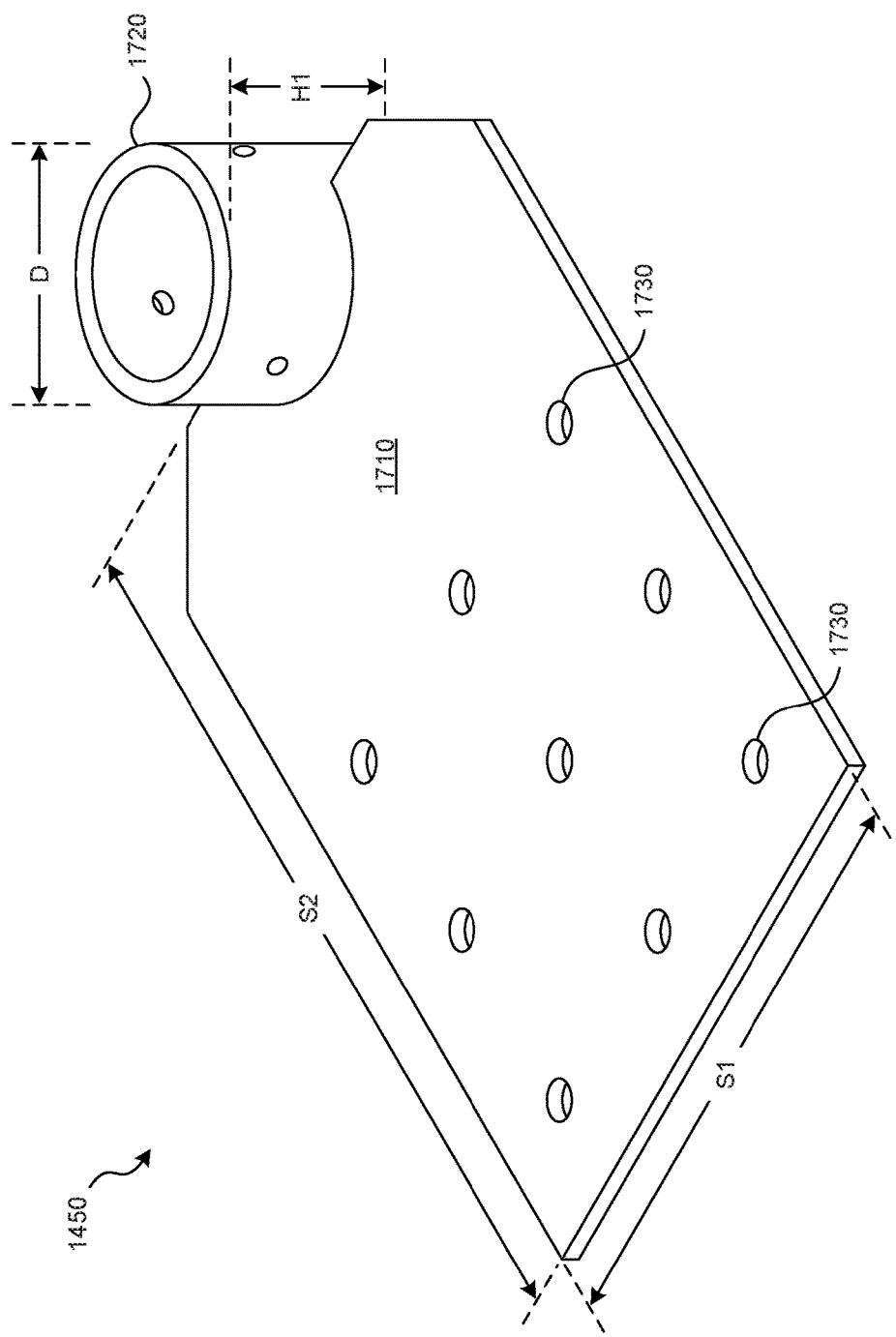
FIG. 15 is an isometric view of the parapet mount shown in FIGS. 12 and 13 in accordance with an embodiment of the present technology.

FIG. 15 is a view of the parapet mount 1450 shown in FIGS. 12 and 13 in accordance with an embodiment of the present technology. The parapet mount 1450 can be formed from a generally rectangular plate 1710 and a cylinder or sleeve 1720 mounted to the plate 1710, to receive the shaft 1430 (not shown) and extending above and below the plate 1710 (such that it extends above and below a mounting surface supporting the plate 1710, for example, one inch below the mounting surface). The plate 1710 can include one or more mounting holes 1730 through which a bolt or other faster can be passed to attach the parapet mount 1450 to the parapet wall 1320 (FIG. 13). In some embodiments, the plate 1710 can have a width S1 of 8 inches and a length S2 of 12 inches. The sleeve 1720 can have a height H1 of 3 inches and an outer diameter D of 3 inches. Other suitable dimensions can be used. The shaft 1430 (see FIG. 12) may pass through the sleeves 1620, 1720 (described above), such that the rooftop mount 1440 and the parapet mount 1450 support the shaft 1430.

The wind turbine generator assembly can include various suitable alternators or generators for converting rotational motion to electric energy. For example, in some embodiments, when a turbine according to the present technology is connected to a suitable alternator or generator, the wind turbine generator assembly may produce between 750 watts and 3 kilowatts.

From the foregoing, it will be appreciated that specific embodiments of the disclosed technology have been described for purposes of illustration, but that various modifications may be made without deviating from the technology, and elements of certain embodiments may be interchanged with those of other embodiments. For example, representative embodiments disclosed herein and illustrated in the accompanying figures show portions of assemblies and assemblies with a nine-blade turbine generator. In other embodiments, turbines can include any suitable number of blades and the mounting plates can include any suitable corresponding number of arms (such as 7, 8, 10, 11, or 12 arms and blades). In some embodiments, dimensions may be scaled up or down while maintaining an 18 degree washout angle. In other embodiments, the washout angle may be suitably modified. Although tubercles and projections may be described herein as being curved, in some embodiments, tubercles according to the present technology may have one or more straight or generally straight portions and/or edges.

Wind Turbine Blade with Leading Edge Tubercles

Figure 16:
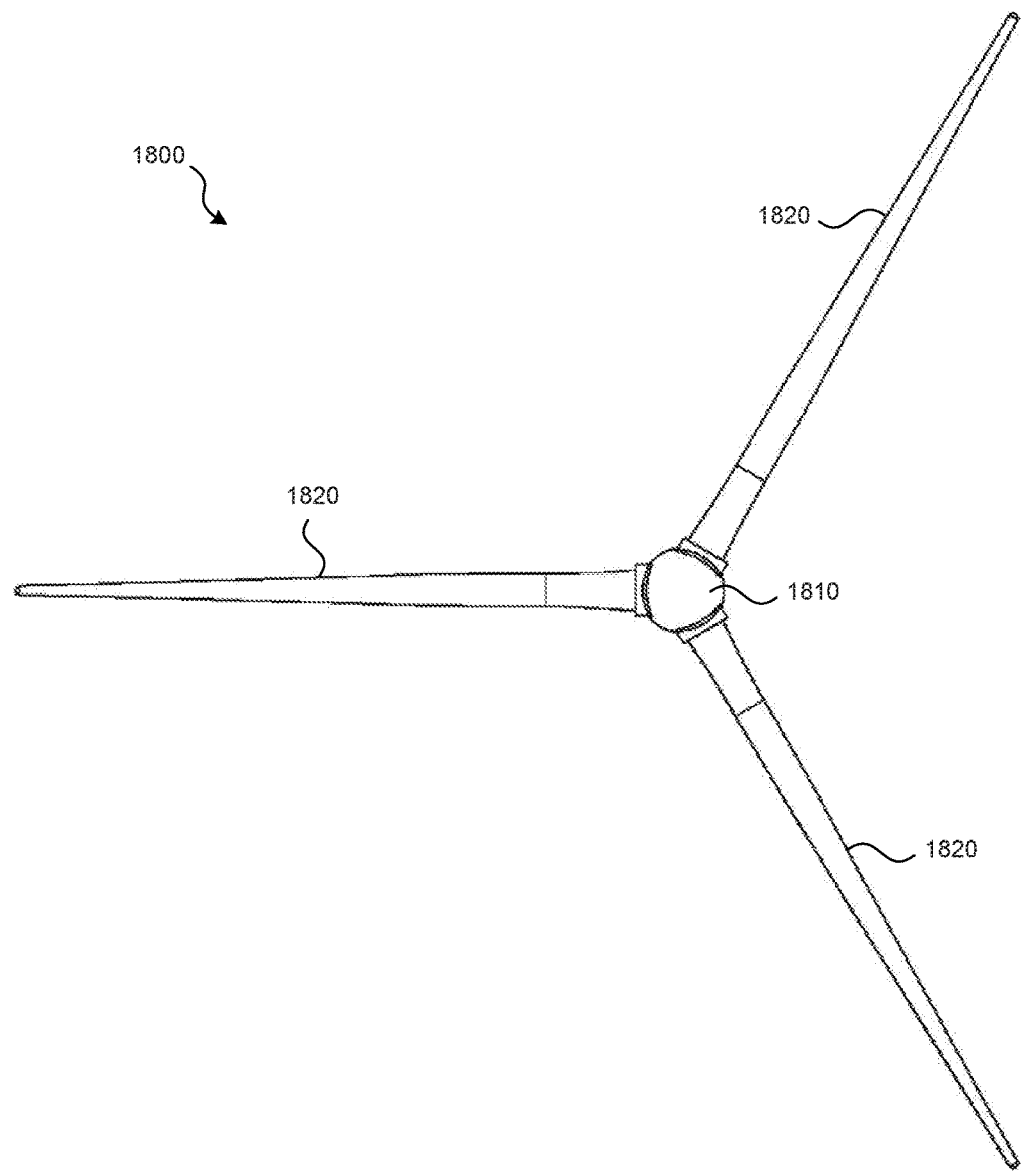
FIG. 16 is a front view of a wind turbine with tubercles in accordance with another embodiment of the present technology.

FIG. 16 is a front view (looking downstream) of a wind turbine 1800 having a central hub 1810 and blades 1820 extending from the central hub 1810 in accordance with another embodiment of the present technology. The wind turbine 1800 may generally be similar to existing large- and medium-scale wind turbines (or other sizes of turbines), except that the blades 1820 may additionally include tubercles (illustrated and explained with respect to FIGS. 17 and 18 below) in accordance with the present technology for increased efficiency. Although three blades 1820 are illustrated in FIG. 16, any suitable number of blades can be used.

Figure 17:
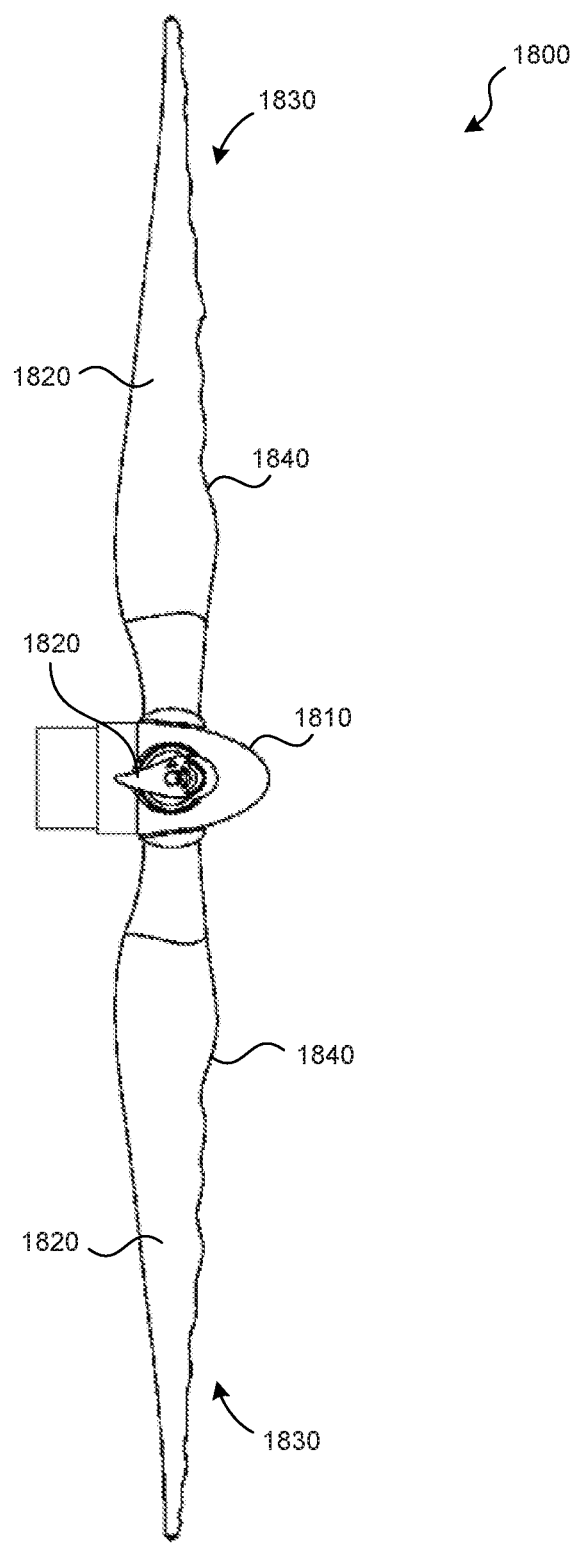
FIG. 17 is a side view of the wind turbine shown in FIG. 16.

FIG. 17 is a side view of the wind turbine 1800 shown in FIG. 16. One or more of the blades 1820 can include tubercles 1830 on the leading edge 1840 (facing the incoming wind stream). The inventors analyzed data from humpback whale fins to design an efficient (for example, optimal) location and size of each of the tubercles 1830.

Figure 18:
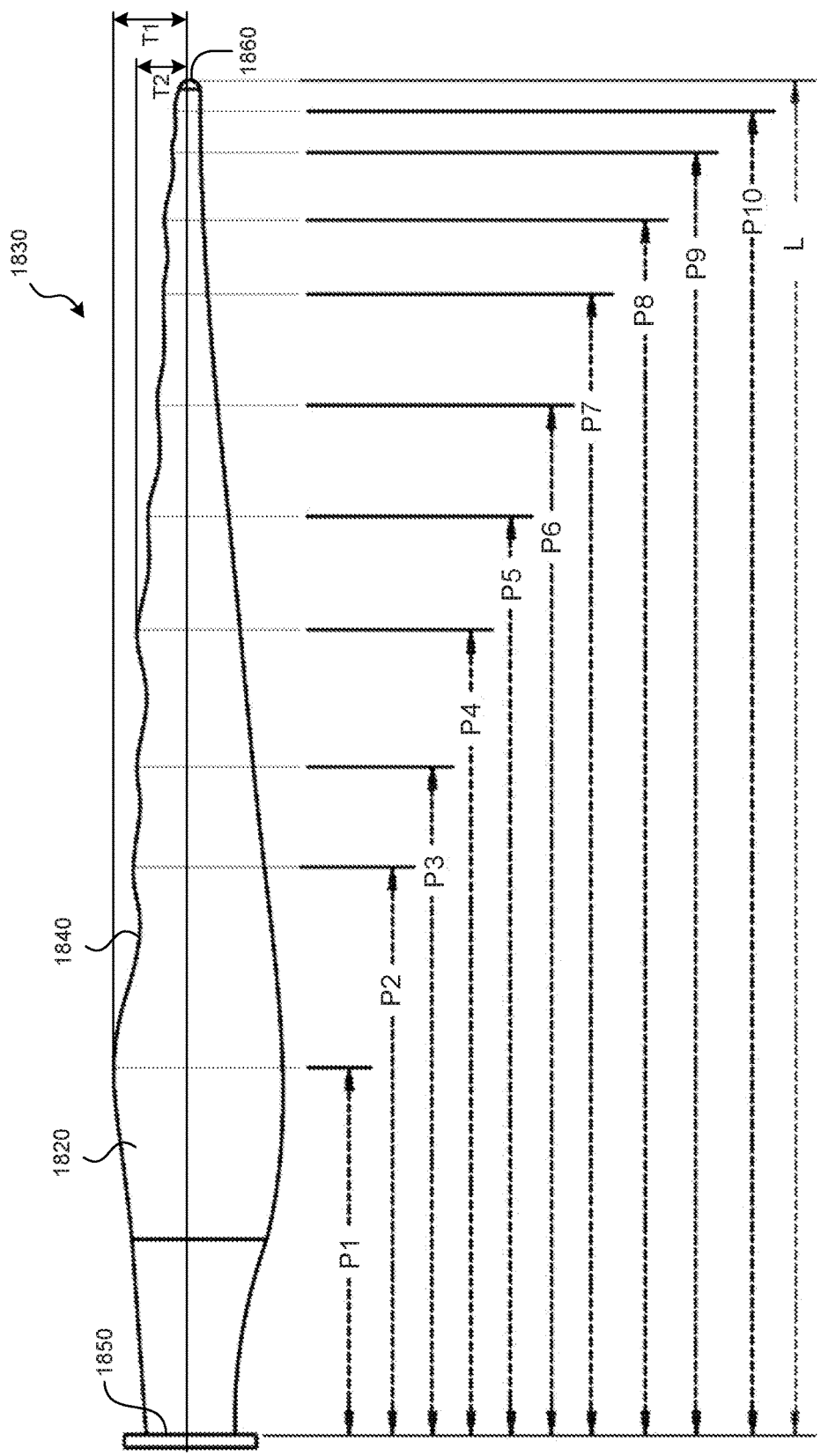
FIG. 18 is a profile view of a wind turbine blade for the wind turbine shown in FIGS. 16 and 17, in accordance with an embodiment of the present technology.

FIG. 18 is a profile view of a wind turbine blade 1820 for the wind turbine 1800 shown in FIGS. 16 and 17, in accordance with an embodiment of the present technology. The blade 1820 has tubercles 1830 on its leading edge 1840. In a representative embodiment, the tubercles 1830 can be positioned at locations along the blade 1820 that are fractions of the total length L of the blade 1820, which spans from the root 1850 to the tip 1860.

For example, a tubercle can be positioned such that its widest point along the chordwise direction of the blade 1820 is at P1, which may be approximately 30% of the length L of the blade 1820 from the root 1850. Another tubercle can be positioned at P2, which may be approximately 45% of the length L of the blade 1820 from the root 1850. Another tubercle can be positioned at P3, which may be approximately 52% of the length L of the blade 1820 from the root 1850. Another tubercle can be positioned at P4, which may be approximately 62% of the length L of the blade 1820 from the root 1850. Another tubercle can be positioned at P5, which may be approximately 70% of the length L of the blade 1820 from the root 1850. Another tubercle can be positioned at P6, which may be approximately 78% of the length L of the blade 1820 from the root 1850. Another tubercle can be positioned at P7, which may be approximately 85% of the length L of the blade 1820 from the root 1850. Another tubercle can be positioned at P8, which may be approximately 91% of the length L of the blade 1820 from the root 1850. Another tubercle can be positioned at P9, which may be approximately 95% of the length L of the blade 1820 from the root 1850. Another tubercle can be positioned at P10, which may be approximately 98% of the length L of the blade 1820 from the root 1850. In other embodiments, other dimensions representative of the position of the widest chordwise point of each tubercle can be used.

In some embodiments, the tubercles can be defined by their relative amplitude with respect to the chord length of the blade 1820. For example, the tubercle located at P1 can have a relative amplitude T1 that is 15% of the chord length at P1. The tubercle located at P4 can have a relative amplitude T2 that is 19% of the chord length at P4. Other suitable dimensions can be used. In some embodiments, the tubercles located at P2, P3, P5, P6, P7, P8, P9, and/or P10 can have relative amplitudes the same as or less than the relative amplitudes of the tubercles located at P1. In some embodiments, the tubercles may each have different relative amplitudes, or some relative amplitudes may be the same. In some embodiments, as shown in FIG. 18, the relative amplitudes stay the same or decrease along the length of the blade with P1 being the largest and P10 being the smallest.

From the foregoing, it will be appreciated that specific embodiments of the disclosed technology have been described for purposes of illustration, but that various modifications may be made without deviating from the technology, and elements of certain embodiments may be interchanged with those of other embodiments. For example, although ten tubercles are illustrated in FIG. 18, embodiments of the present technology contemplate the use of any suitable number of tubercles. For example, in some embodiments, more tubercles may be used in longer blades, while in other embodiments, fewer tubercles may be used in shorter blades. In yet other embodiments, the number of tubercles may be the same among various sizes of blades (for example, the tubercles may be scaled up or down in size corresponding to the relative blade sizes). Although tubercles and projections may be described herein as being curved, in some embodiments, tubercles according to the present technology may have one or more straight or generally straight portions and/or edges.

Further, while advantages associated with certain embodiments of the disclosed technology have been described in the context of those embodiments, other embodiments may also exhibit such advantages, and not all embodiments need necessarily exhibit such advantages to fall within the scope of the technology. Accordingly, the disclosure and associated technology may encompass other embodiments not expressly shown or described herein, and the invention is not limited except as by the appended claims.

What is claimed is:

1. A wind turbine generator assembly for converting wind into electrical energy, the assembly comprising
   a wind turbine; and
   a generator configured to receive rotational force from the wind turbine and convert the rotational force to electrical energy; wherein
   the wind turbine comprises a mounting element and a plurality of turbine blades attached to the mounting element; and wherein
   at least one of the turbine blades comprises
      a root, the root comprising a root edge positioned to face a rotational axis of the wind turbine,
      a tip positioned opposite the root,
      a leading edge spanning between the root and the tip along a length of the blade, the leading edge having a length greater than a length of the root and a length of the tip, and
      a trailing edge positioned opposite the leading edge and spanning between the root and the tip along the length of the blade;
   wherein the root edge further comprises a plurality of curved projections extending radially inwardly toward the rotational axis of the wind turbine.

2. The wind turbine generator assembly of claim 1 wherein the at least one of the turbine blades has a radius of curvature along its length forming a concave face oriented away from the mounting element.

3. The wind turbine generator assembly of claim 1 wherein the root and the tip are rotated relative to each other such that the at least one of the turbine blades is twisted along its length.

4. The wind turbine generator assembly of claim 1 wherein the mounting element comprises a mounting plate having a central region and a plurality of arms extending outwardly from the central region, wherein each turbine blade is supported by at least one of the plurality of arms.

5. The wind turbine generator assembly of claim 1, further comprising a mounting flange configured to connect the mounting element to the generator, wherein at least one of the mounting flange or the mounting element comprises one or more nub elements configured to engage with one or more recesses on the other of the mounting flange or the mounting element.

6. The wind turbine generator assembly of claim 1, further comprising a support structure configured to support the wind turbine and generator, the support structure comprising:
- a shaft;
- a first mounting assembly configured to receive a base of the shaft; and
- a second mounting assembly configured to support an intermediate portion of the shaft.

7. The wind turbine generator assembly of claim 6 wherein at least one of the first mounting assembly or the second mounting assembly comprises a sleeve attached to a plate, the sleeve being configured to receive the shaft.

8. The wind turbine generator assembly of claim 1 wherein the at least one of the turbine blades comprises high density polyethylene (HDPE).

9. A wind turbine comprising a mounting element and a plurality of turbine blades, each turbine blade comprising:
- a curved root positioned adjacent the mounting element,
- a tip positioned opposite the root,
- a leading edge spanning between the root and the tip along a length of the turbine blade, and
- a trailing edge spanning between the root and the tip opposite the leading edge;
  wherein
  each turbine blade has a radius of curvature along its length to form a concave face oriented away from the mounting element, and
  the root and the tip of each turbine blade are rotated relative to each other such that each turbine blade is twisted along its length; and wherein
  each turbine blade is attached to the mounting element closer to the trailing edge of the turbine blade than to the leading edge of the turbine blade such that an intersection of the leading edge of each turbine blade and the root of each turbine blade projects upstream from the wind turbine; and wherein
  the root comprises a root edge and a plurality of tubercles distributed along the entire root edge between the leading edge and the trailing edge.

10. The wind turbine of claim 9 wherein each turbine blade of the plurality of turbine blades at least partially overlaps another turbine blade of the plurality of turbine blades.

11. The wind turbine of claim 9 wherein each turbine blade comprises high density polyethylene (HDPE).

12. The wind turbine blade of claim 11 wherein each turbine blade further comprises one or more additive materials configured to inhibit UV radiation, stiffen the turbine blade, reduce brittleness, and/or color the turbine blade.

13. The wind turbine of claim 9, further comprising a mounting flange configured to connect the mounting element to a shaft of a generator.

14. The wind turbine of claim 9 wherein the root and the tip are rotated relative to each other by a washout angle of between 16 and 20 degrees.

15. The wind turbine of claim 9 wherein each turbine blade is attached to the mounting element via a generally flat region of the turbine blade.

16. A blade for a wind turbine, the blade comprising:
- an elongated and curved sheet having a curved root, a curved tip positioned opposite the root, a leading edge spanning between the root and the tip along a length of the blade, and a trailing edge spanning between the root and the tip opposite the leading edge; wherein
  the root and the tip are rotated relative to each other such that the blade is twisted along its length, and wherein
  the root comprises a root edge connecting the leading edge and the trailing edge, the root edge having a plurality of curved projections, the curved projections being distributed along a curvature of the root edge.

17. The blade of claim 16 wherein a region of the blade adjacent the trailing edge is generally flat.

18. The blade of claim 16 wherein the blade comprises one or more mounting holes configured to connect the blade to a mounting element.

19. The blade of claim 16 wherein the blade comprises high density polyethylene (HDPE).

20. The blade of claim 16 wherein the root and the tip are rotated relative to each other by a washout angle of between 16 and 20 degrees.

* * * * *